(12) United States Patent
McNally et al.

(10) Patent No.: US 7,746,604 B2
(45) Date of Patent: Jun. 29, 2010

(54) METHOD, SYSTEM, AND COMPUTER SOFTWARE CODE FOR DETECTION AND ISOLATION OF ELECTRICAL GROUND FAILURE AND SECONDARY FAILURE

(75) Inventors: Christopher Wade McNally, Girard, PA (US); Ajith K. Kumar, Erie, PA (US); Bret Dwayne Worden, Union City, PA (US); Theodore Clark Brown, Ripley, NY (US)

(73) Assignee: General Electric Company, Schenectady, NY (US)

( * ) Notice: Subject to any disclaimer, the term of this patent is extended or adjusted under 35 U.S.C. 154(b) by 634 days.

(21) Appl. No.: 11/533,397

(22) Filed: Sep. 20, 2006

(65) Prior Publication Data

US 2007/0013232 A1    Jan. 18, 2007

Related U.S. Application Data

(60) Continuation-in-part of application No. 11/401,664, filed on Apr. 11, 2006, now Pat. No. 7,256,974, which is a division of application No. 10/115,859, filed on Apr. 2, 2002, now Pat. No. 7,035,065.

(51) Int. Cl.
*H02H 3/00* (2006.01)
*H02H 5/04* (2006.01)
*H02H 7/08* (2006.01)

(52) U.S. Cl. ............................ 361/42; 361/23; 361/31; 361/103

(58) Field of Classification Search .................. 361/42, 361/23, 31, 103
See application file for complete search history.

(56) References Cited

U.S. PATENT DOCUMENTS

| | | | | |
|---|---|---|---|---|
| 3,496,414 A | * | 2/1970 | Logston, Jr. | 361/33 |
| 3,742,303 A | * | 6/1973 | Dageford | 361/22 |
| 4,048,664 A | * | 9/1977 | Kirilloff | 361/89 |
| 4,203,058 A | * | 5/1980 | Chen | 318/380 |
| 4,541,031 A | | 9/1985 | Ibbetson | |
| 4,754,360 A | * | 6/1988 | Nakada | 361/8 |
| 4,827,369 A | | 5/1989 | Saletta et al. | |
| 4,896,089 A | * | 1/1990 | Kliman et al. | 318/701 |
| 5,160,926 A | | 11/1992 | Schweitzer, III | |
| 5,282,212 A | | 1/1994 | Shah | |
| 5,309,109 A | | 5/1994 | Miyazaki et al. | |

(Continued)

*Primary Examiner*—Stephen W Jackson
*Assistant Examiner*—Zeev Kitov
(74) *Attorney, Agent, or Firm*—Robert Wawrzyn, Esq.; Terry M. Sanks, Esq.; Beusse Wolter Sanks Mora & Maire, P.A.

(57) ABSTRACT

In an off-road vehicle having a resistor grid network and a blower system as part of a braking system operable to determine at least one of a resistor failure and a blower failure, the system including a first series of resistors connected in series, a second series of resistors connected in series, a blower cross to at least one of the first series of resistors and the second series of resistors, a sensor proximate at least one of the first series of resistors, the second series of resistors, and the blower, wherein each individual resistor in the first series connected in parallel to an individual resistor in the second series, and wherein when at least one of a current value, blower speed, and voltage value changes, the grid network is disconnected.

8 Claims, 34 Drawing Sheets

U.S. PATENT DOCUMENTS

| | | |
|---|---|---|
| 5,508,872 A | 4/1996 | Khoo et al. |
| 5,561,380 A | 10/1996 | Sway-Tin et al. |
| 5,710,777 A | 1/1998 | Gawne |
| 5,768,079 A | 6/1998 | Buell |
| 5,872,457 A | 2/1999 | Williams |
| 5,877,926 A | 3/1999 | Moisin |
| 5,945,802 A * | 8/1999 | Konrad et al. ............... 318/807 |
| 5,946,172 A | 8/1999 | Hansson et al. |
| 5,990,686 A | 11/1999 | Vokey et al. |
| 6,002,563 A | 12/1999 | Esakoff et al. |
| 6,049,143 A | 4/2000 | Simpson et al. |
| 6,081,122 A | 6/2000 | McCary |
| 6,318,160 B1 | 11/2001 | Bessler |
| 6,347,025 B1 | 2/2002 | Ulrich et al. |
| 6,497,182 B2 | 12/2002 | Melpolder et al. |
| 6,876,104 B1 * | 4/2005 | Guo ........................... 307/140 |

* cited by examiner

FIG. 14A

| | Logic for grid_box[n]_failure_detected | |
|---|---|---|
| | [A and B and {((C and D) or E) and F} or G}] or [H and B and {(C and J) or E} and L] | |
| Label | Condition | Description |
| A | grid_boxes_actual = MAX_GRID_BOXES | All grid boxes are in use. —320 |
| B | max(grid_blwr_spd[all n] > GRID_FAIL_MIN_BLWR_SPD<br>AND<br>dyn_brk_grid_pwr_filt > GRID_FAIL_MIN_POWER<br>AND<br>grid_blwr_spd_qb[all n] = Q_GOOD | At least one blower is going above the minimum speed required for failure with all qualities good, and there is minimum power. —322 |
| C | main_sv = BRAKE<br>AND<br>link_volt_avg > GRID_FAIL_MIN_LINK_VOLTS<br>AND<br>ta_rectifier_bias_state = REVERSED | The unit is in braking, link voltage is above minimum voltage, and the traction alternator rectifier is reversed biased. —324 |
| D | grid_ohms_ratio < DB_MAX_BOXES_R_MIN<br>OR<br>grid_ohms_ratio > DB_MAX_BOXES_R_MAX | The ratio of grid resistance is outside standard tolerance levels. —326 |
| E | grid_ohms_ratio < DB_WORST_CASE_R_MIN<br>OR<br>grid_ohms_ratio > DB_WORST_CASE_R_MAX | The ratio of grid resistance is outside worst case tolerance levels. —328 |

| | | |
|---|---|---|
| F | (grid_blwr_spd[n]/median(grid_blwr_spd[all n])) < MAX_BOXES_BLWR_SPD_DIFF_MIN<br>OR<br>(grid_blwr_spd[n]/median(grid_blwr_spd[all n])) > MAX_BOXES_BLWR_SPD_DIFF_MAX | The ratio of this grid blower speed to the average of the other two blower speeds is outside standard tolerance levels. — 330 |
| G | (grid_blwr_spd[n]/median(grid_blwr_spd[all n])) < WORST_CASE_BLWR_SPD_DIFF_MIN<br>OR<br>(grid_blwr_spd[n]/median(grid_blwr_spd[all n])) > WORST_CASE_BLWR_SPD_DIFF_MAX | The ratio of grid blower speed to the average of the other two blower speeds is outside worst case tolerance levels. — 332 |
| H | grid_boxes_actual < MAX_GRID_BOXES<br>AND<br>ta_rectifier_bias_state = REVERSED | Not all grid boxes are in use and the traction alternator rectifier is reversed biased. — 334 |
| J | grid_ohms_ratio < DB_LT_MAX_BOXES_R_MIN<br>OR<br>grid_ohms_ratio > DB_LT_MAX_BOXES_R_MIN | The ratio of grid resistance is outside standard tolerance levels. — 336 |
| L | (grid_blwr_spd[n]/grid_blwr_spd_model) < MODEL_BLWR_SPD_DIFF_MIN<br>OR<br>(grid_blwr_spd[n]/grid_blwr_spd_model) > MODEL_BLWR_SPD_DIFF_MAX | The ratio of this grid blower speed to the modeled blower speed is outside standard tolerance levels. — 338 |

AC ground isolation process with motor 2 grounded:

Dynamic Braking Grid Failure
Isolation Process with Grid Box 3 Failed

METHOD, SYSTEM, AND COMPUTER SOFTWARE CODE FOR DETECTION AND ISOLATION OF ELECTRICAL GROUND FAILURE AND SECONDARY FAILURE

This is a continuation-in-part of U.S. application Ser. No. 11/401,664 filed Apr. 11, 2006, now U.S. Pat. No. 7,256,974 which is a divisional of application Ser. No. 10/115,859 filed Apr. 2, 2002, now U.S. Pat. No. 7,035,065 issued Apr. 25, 2006, which is incorporated by reference herein in its entirety.

BACKGROUND OF THE INVENTION

This invention relates to electrical systems and more particularly, to a system, and method, and computer software code for isolating electrical ground and secondary failures in electrical systems.

Electrical systems may sometimes encounter faults, such as AC grounds, DC grounds or impedances outside of acceptable ranges. When such faults occur, they may mildly or seriously damage the electrical system. Electrical systems are used in a vast variety of machines or components.

One such apparatus which uses a variety of electrical systems is a locomotive. A locomotive has a plurality of electrical systems on it. One such electrical system on a locomotive is a propulsion system. For example, a conventional diesel electric locomotive generally has a prime mover, typically a turbo-charged diesel engine with cylinders ranging from twelve to sixteen, to drive an electrical transmission. The electrical transmission generally comprises a synchronous generator that supplies electric current to a plurality of alternating current (AC) traction motors whose rotor are drivingly coupled through speed reducing gearing to respective axle wheel sets of the locomotive.

In one version, these locomotives will have an individual inverter connected to an individual traction motor while in other versions there may be multiple traction motors connected to a single inverter. The number of combinations of inverters/traction motors on a locomotive may vary also, such as from three to six, depending of the type or style of locomotive. The inverters and traction motors are used for propulsion and braking. Again, depending on the type of locomotive, there can be a plurality of parallel paths of dynamic braking grids or grid boxes, such as ranging from three to six parallel paths of dynamic braking grids. Each grid box can be either a series or parallel combination of resistances. The generator typically comprises a main three-phase traction alternator. When excitation current is supplied to field windings on the rotating rotor, alternating voltages are generated in three-phase armature windings on the stator of the alternator. These voltages are rectified to produce a controlled amplitude DC voltage and then applied to one or more of the inverters which control the effective frequency of alternating current to be supplied to the armature windings of the traction motors.

During dynamic braking, power comes from the traction motors. If there is not enough power from the traction motors, additional power is supplied from the alternator to the braking grids to maintain a proper DC link voltage to support traction motor excitation. At low speeds, when there is little power from the traction motors, most of the power is provided from the alternator during braking.

While in operation, electrical grounds, either an AC ground or DC ground, may develop in the propulsion circuit. An AC ground is a ground where the voltage at the ground fault point has a predominantly AC component with respect to the system grounding point. A DC ground is a ground where the voltage at the ground fault point has a predominantly DC component with respect to the ground. Thus as an illustration, in a DC locomotive, the system grounding point is typically at neutral point of the alternator. If the grounding point is the neutral of the alternator and if a ground on a DC bus exists, the ground may appear as an AC ground.

If not detected in time, this problem can severally damage components of the propulsion system. Additionally, impedance changes could occur which could also damage components of the propulsion system. Resistance changes occur because of either a short or an open circuit in a resistance. An open circuit in a portion of a resistor or a short circuit in a portion of a resistor, which would change the resistance, could damage additional components. Either certain components or the rest of the circuit may encounter a high power density or higher temperatures, thus damaging the electrical system.

Even though systems and techniques may exist today to effectively handle these problems, they do not necessarily apply less total power, less time in power, and less power for any components which are experiencing increased stress as a result of the original component failure. Furthermore, they do not all provide for a confirmation process to ensure isolation accuracy of failed components. They also do not provide for an early failure detection and handling based on specific operation information which may include comparison between similar devices.

Additionally, AC locomotives typically have from four (4) to six (6) parallel electrical paths for dynamic braking resistors. Any failure of these resistors and any associated circuits can cause extensive damage to the resistor system and other equipment if operation in a failed state continues for a sufficiently long time. Similar conditions exist in DC locomotives wherein they also may have 4 or 6 electrical paths for dynamic brake resistors. However they are connected independently.

BRIEF DESCRIPTION OF THE INVENTION

The present invention is directed towards a system, and method, and computer software code for isolating electrical ground and secondary failures in electrical systems. Towards this end, in an exemplary embodiment this invention discloses a method for isolating an AC electrical ground fault in an electrical system including isolating a component causing said AC ground, verifying said component is actually causing said AC ground, and isolating said component causing said ground. This invention also discloses a method for isolating a DC electrical ground fault in an electrical system comprising detecting a DC ground, isolating a suspected component, verifying said isolated component is causing said DC ground, and if said component is not verified as causing said DC ground, considering other sources causing said ground. Another disclosed part of this invention is a method for isolating a DC electrical fault in an electrical system comprising isolating a suspected component when a change in resistance is detected and verifying said isolated component is causing said change in resistance. A method for detecting an early failure in a component in an electrical system is also disclosed. This method comprises providing a model of operational conditions, collecting actual operational conditions, and comparing said model of operational conditions with said actual operational conditions to determine when said failure occurs.

This invention also discloses, in another exemplary embodiment, a system for isolating AC electrical ground faults in an electrical system. The system includes a plurality of components, a first state where said system waits until an AC ground is detected, a second state to isolate a component causing said AC ground, a third state to verify component causing said AC ground is actually causing said ground, a fourth state to isolate said component causing said ground, and a fifth state to enable said component after a specific period. A system for isolating DC electrical ground faults in an electrical system is also disclosed. This system comprises a plurality of components, a first state where said system waits until a DC ground is detected, a second state where said systems transitions when a DC ground is detected to isolate a suspected component, a third state to verify said suspected component isolated is causing said DC ground, and a fourth state to consider other sources if a suspected component is not identified as causing said DC ground.

A system for isolating a change in resistance in an electrical system is also disclosed in another exemplary embodiment. This system includes a plurality of components, a first state where said system waits until a change in resistance is detected, a second state where said systems transitions when a change in resistance is detected to isolate a suspected component, and a third state to verify said suspected component isolated is causing said change in resistance. Finally, a system for detecting an early failure in a component in an electrical system is disclosed. The system comprises a model of operational conditions specific to said component, a collection of actual operational conditions from said component, and a processor to compare said model of operational conditions with said collection of actual operational conditions to determine when said failure occurs.

In another exemplary embodiment for an off-road vehicle having a resistor grid network and a blower system as part of a braking system operable to determine a resistor failure and/or a blower failure a system is disclosed. The system includes a resistor forming a grid network, a blower connected to the resistor, and a sensor proximate the blower to measure a value associated with the blower. When the measured value is outside of a specific range, the grid network is disconnected.

In yet another exemplary embodiment for an off-road vehicle having a resistor grid network, with a plurality of nodes, and a blower system as part of a braking system operable to determine a failure a system is disclosed. The system includes a resistor forming a grid network, and a sensor proximate the resistor to monitor a measurable value. When the measurable value changes beyond a predefined range approximate the resistor, the grid network is disconnected.

In another exemplary embodiment, for an off-road vehicle having a resistor grid network as part of a braking system operable to determine a failure a system is a first series of resistors connected in series, a second series of resistors, a blower cross to the first series of resistors and/or the second series of resistors, and a sensor proximate the first series of resistor, the second series of resistors, and/or the blower. Each individual resistor in the first series is connected in parallel to an individual resistor in the second series. When a current value, blower speed, and/or voltage value changes, the grid network is disconnected.

In yet another exemplary embodiment for an off-road vehicle having a resistor grid network and a blower system as part of a braking system operable to determine a resistor failure and/or a blower failure a system is disclosed. The system includes a first series of resistors connected in series, a second series of resistors connected in series, a blower cross connected between the first series of resistors and the second series of resistors, and a sensor connected in series with the blower to monitor a measurable value. When the measurable value is outside of a specified range, the grid network is disconnected.

In another exemplary embodiment, in an off-road vehicle having a resistor grid network as part of a braking system operable to determine a failure, a method for reducing secondary damage is disclosed. The method includes creating a voltage signal by measuring voltages proximate an element within the grid network. The voltage signal is supplied to a processor. Changes in the voltage signal are detected. If a change in voltage is determined, power to the element is reduced at the location where the voltage signal was measured.

In yet another exemplary embodiment, in an off-road vehicle having a processor, resistor grid network and a blower system as part of a braking system operable to a resistor failure and/or a blower failure, a computer code for reducing secondary damage is disclosed. The computer software code includes a computer module for creating a voltage signal by measuring voltages within the grid network, a computer module for supplying the voltage signal to a processor, and a computer module for detecting changes in the voltage signal. If a change in voltage is determined, a computer module for reducing power to an element where the voltage signal was measured is also disclosed.

In another exemplary embodiment, in an off-road vehicle having a plurality of electrical components used to operate the off-road vehicle, a method for reducing secondary damage is disclosed. The method includes monitoring a physical characteristic of the electrical component, and detecting a change in the physical characteristic of the electrical component. If the physical characteristic changes beyond an acceptable range, the method further includes disabling the electrical component.

In yet another exemplary embodiment, in an off-road vehicle having a plurality of electrical components used to operate the off-road vehicle, a method for reducing secondary damage is disclosed. The method includes determining an actual measurable value, and determining a threshold value. If the actual measurable value is not proximate the threshold value, the method further discloses reducing power and/or removing power from at least one of the electrical components.

BRIEF DESCRIPTION OF THE DRAWINGS

The features and advantages of the present invention will become apparent from the following detailed description of the invention when read with the accompanying drawings in which:

FIG. 14 is an exemplary chart illustrating conditions and descriptions for a Dynamic Braking Grid Failure Early Detection System;

DETAILED DESCRIPTION OF THE INVENTION

Figure 1:
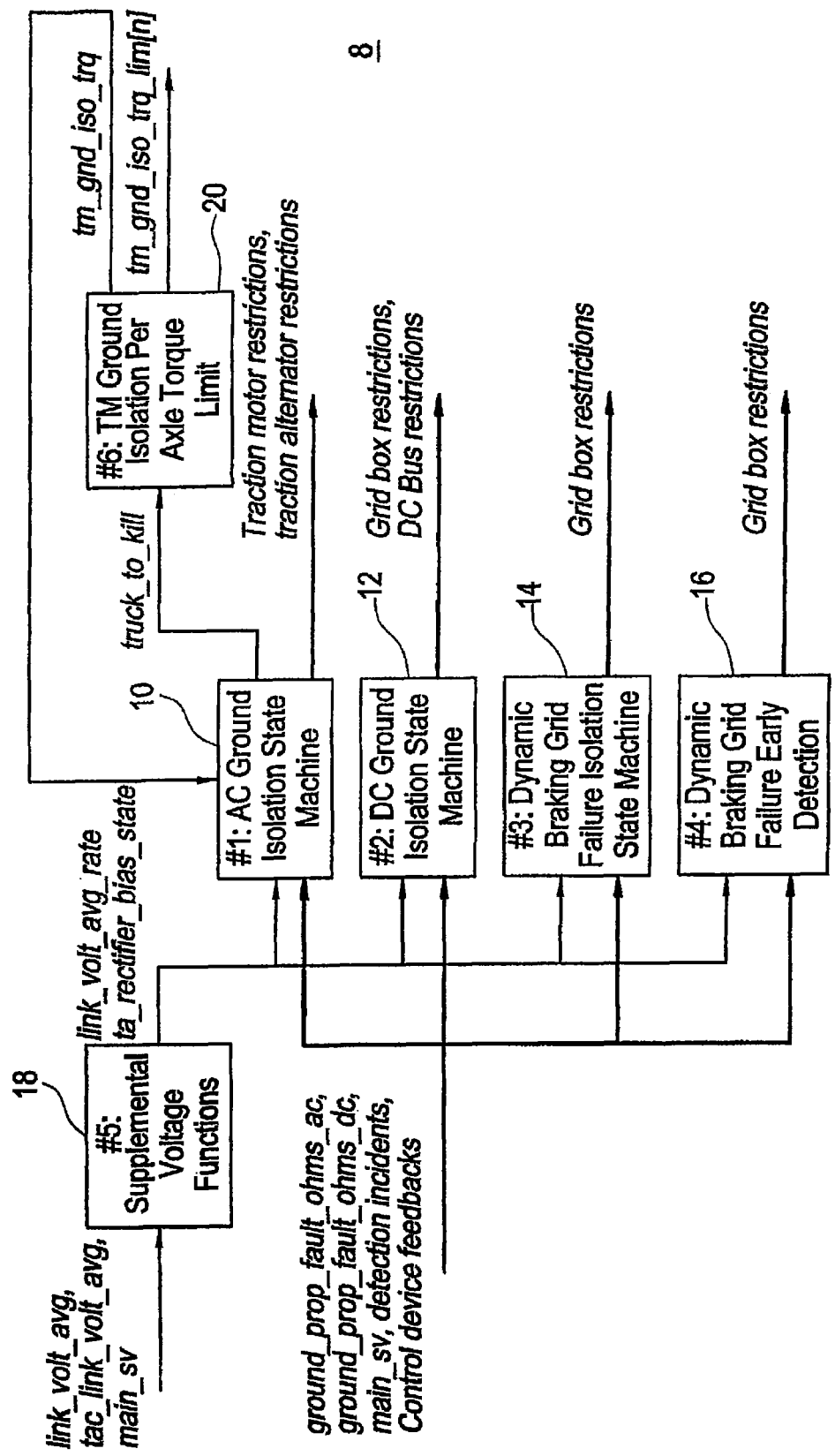
FIG. 1 is an exemplary block diagram of state machines that includes an electrical ground isolation and secondary failure reduction system.

With reference to the figures, exemplary embodiments of the invention will now be described. The scope of the invention disclosed is applicable to a plurality of electrical systems, which could have a fault caused by an AC ground, DC ground, or resistance change or failure. Thus, even though this invention is disclosed specific to a propulsion electrical system on a locomotive, this invention is applicable to other locomotive electrical systems, as well as other electrical systems in general. For example, the invention is also applicable for off-highway vehicles which utilize similar braking and propulsion systems. Towards this end, off-road vehicles may refer to a locomotive and an off-highway vehicle. The present invention solves the problems in the art by providing a system, method, and computer implemented method. Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the invention.

Broadly speaking, the invention provides a method, apparatus, and program for detecting a resistor grid failure and isolating the failure. To facilitate an understanding of the present invention, it is described hereinafter with reference to specific implementations thereof. The invention may use program modules that may include routines, programs, objects, components, data structures, etc. that perform particular tasks or implement particular abstract data types. For example, the software programs that underlie the invention can be coded in different languages for use with different platforms.

Those skilled in the art will appreciate that the invention may be practiced with a plurality of computer system configurations, including multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the locomotive, or adjacent locomotives in consist, or offboard in wayside or central offices where wireless communication is used.

FIG. 1 is an exemplary embodiment of a block diagram of state machines that may comprise an electrical ground isolation and secondary failure reduction system. The electrical ground isolation and secondary failure reduction system may comprise an AC ground isolation state machine 10, a DC ground isolation state machine 12, a dynamic braking grid failure isolation state machine 14, a dynamic braking grid failure early detection algorithm 16, a supplemental voltage functions system 18, and a traction motor ground isolation per axle torque limit system 20. As illustrated, results from the supplemental voltage functions system 18 may be used in the AC ground isolation state machine 10, the DC ground isolation state machine 12, the dynamic braking grid failure isolation state machine 14, and the dynamic braking grid failure early detection algorithm 16. The results from the AC ground isolation state machine 10 are used in the traction motor ground isolation per axle torque limit system 20, where the resulting information is then fed back into the AC ground isolation state machine 10.

As is further illustrated in FIG. 1, the AC ground isolation state machine 10, the DC ground isolation state machine 12, the dynamic braking grid failure isolation state machine 14, and the dynamic braking grid failure early detection algorithm 16 are activated when either ground propulsion faults, operating state of the locomotive (i.e., motoring, braking, self-powered, idling, powered or not powered), detection incidents, and/or control device feedbacks are detected and relayed to the system 8. More specifically, the system 8 operates in three modes while a locomotive is under a powered mode. The AC ground isolation state machine 10, illustrated in FIGS. 3-5, will investigate AC grounds detected. The DC ground isolation state machine 12, illustrated in FIGS. 6-9, will investigate DC grounds detected. The dynamic braking grid failure isolation state machine 14, illustrated in FIGS. 10-13, will investigate changes in the resistance grid. The dynamic braking grid failure early detection algorithm 16, illustrated in FIG. 14, will investigate changes in blower speed coupled with resistance changes in order to get an immediate detection that a problem is occurring in the circuit.

Figure 15:
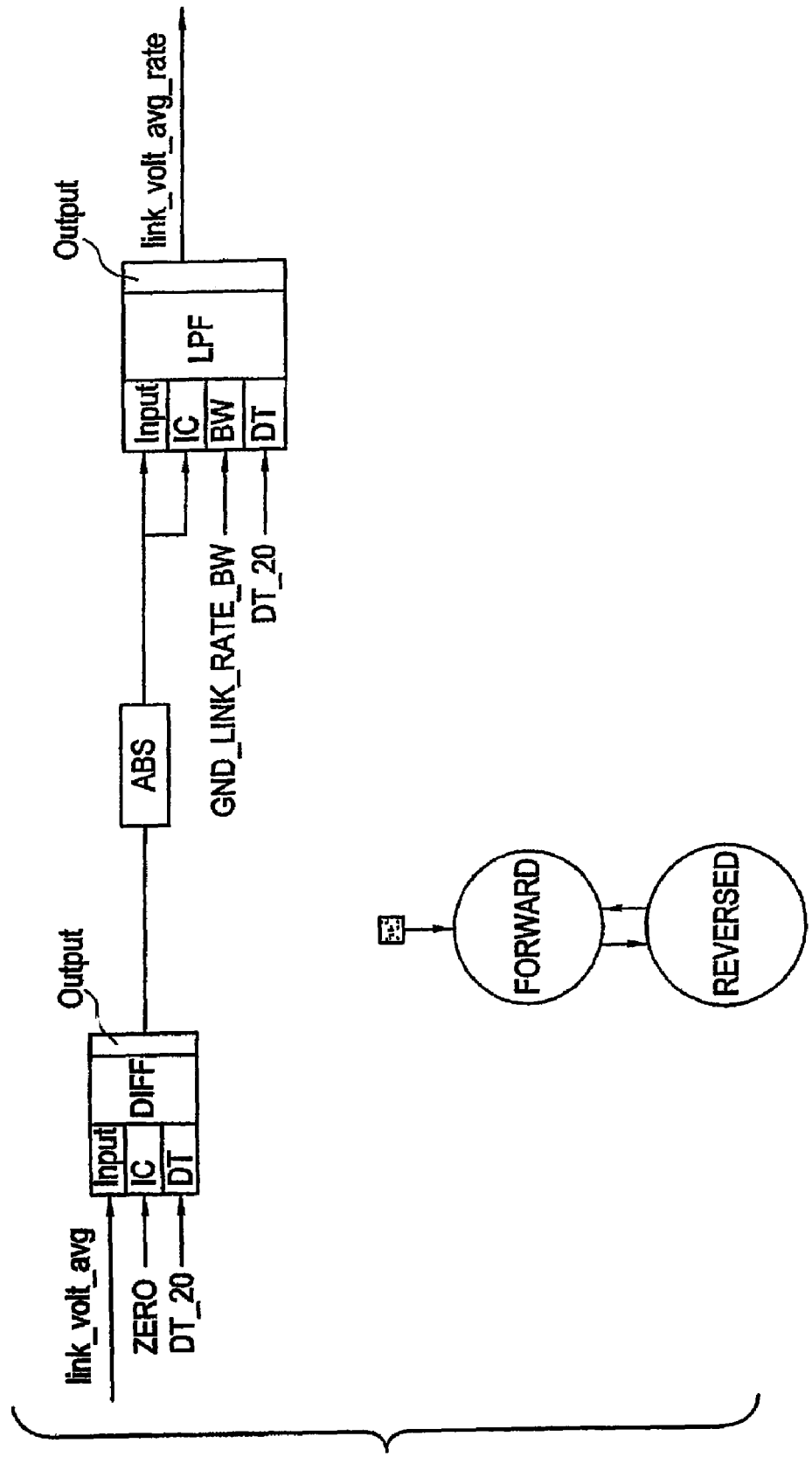
FIG. 15 is an exemplary diagram representing supplemental voltage function.

The supplemental voltage function system 18, illustrated in FIG. 15, calculates the rate of change to make sure the voltage has filtered out before any determination is made so there is no transience in the system's detection or decisions. The reason to allow for no transience is to insure that ground detection equipment can follow the voltage. In one embodiment, if the ground detection equipment is fast, then there is not a need to wait before determining if a ground exists. Thus, in a preferred embodiment the transience needs only to settle down to a level where the ground detection equipment can follow it. The purpose of these functions is to support the propulsion circuit ground/failure detections and isolations. This system provides the system with voltage average rates and alternator rectifier bias state information.

Figure 2:
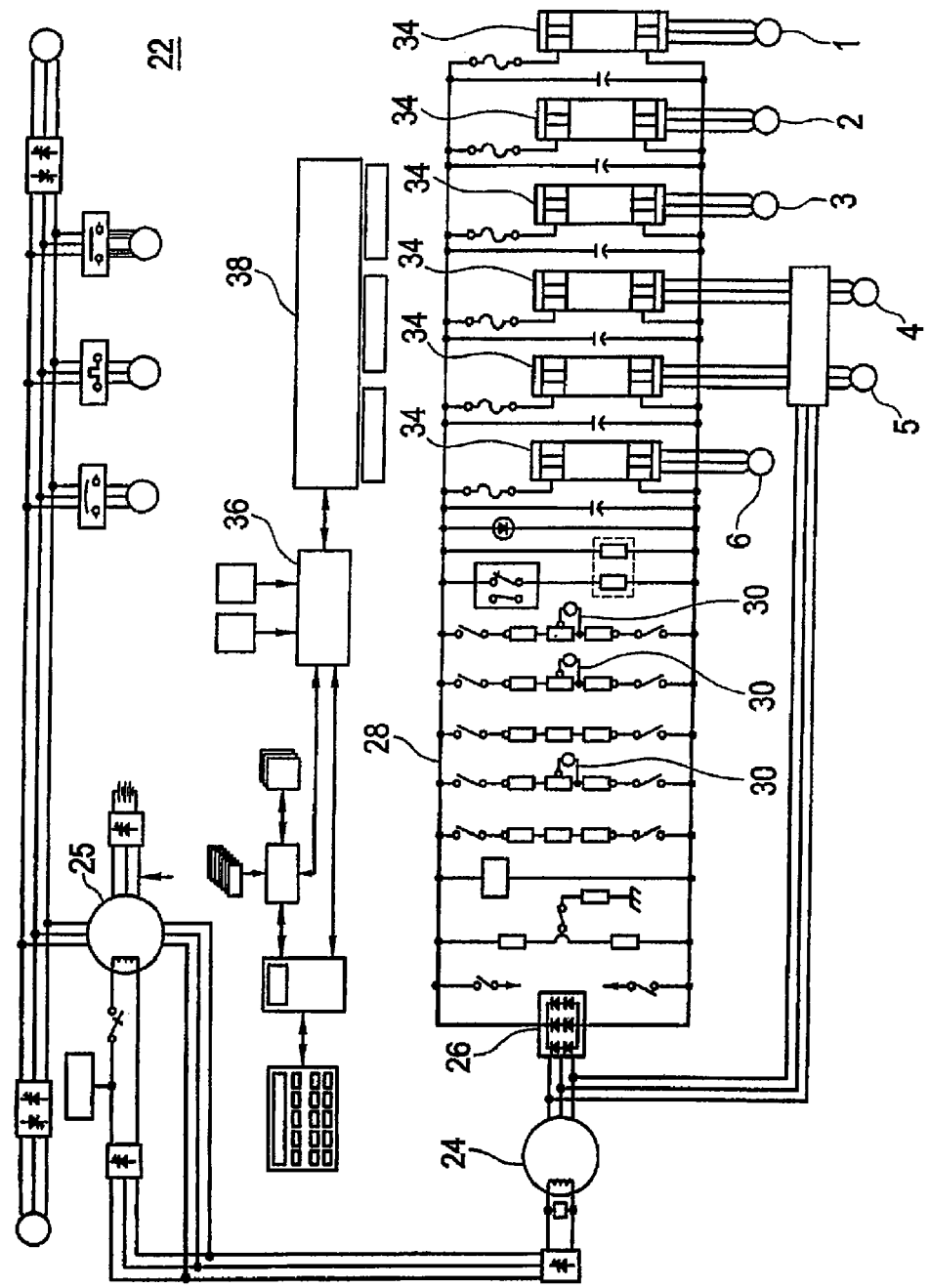
FIG. 2 is a simplified diagram of a typical power system for a diesel electric locomotive.

FIG. 2 is a simplified diagram of a typical power system for a diesel electric locomotive. As illustrated in FIG. 2, the power system comprises a circuit 22 that has an alternator 24, main rectifier 26, and dynamic braking grid 28, which includes blowers 30. Also illustrated are 6 traction motors 1, 2, 3, 4, 5, 6 each connected to an individual inverter 34. FIG. 2 also illustrates the propulsion system controller 36 and traction motor controller 38, which are utilized in part in the present invention.

Figure 3:
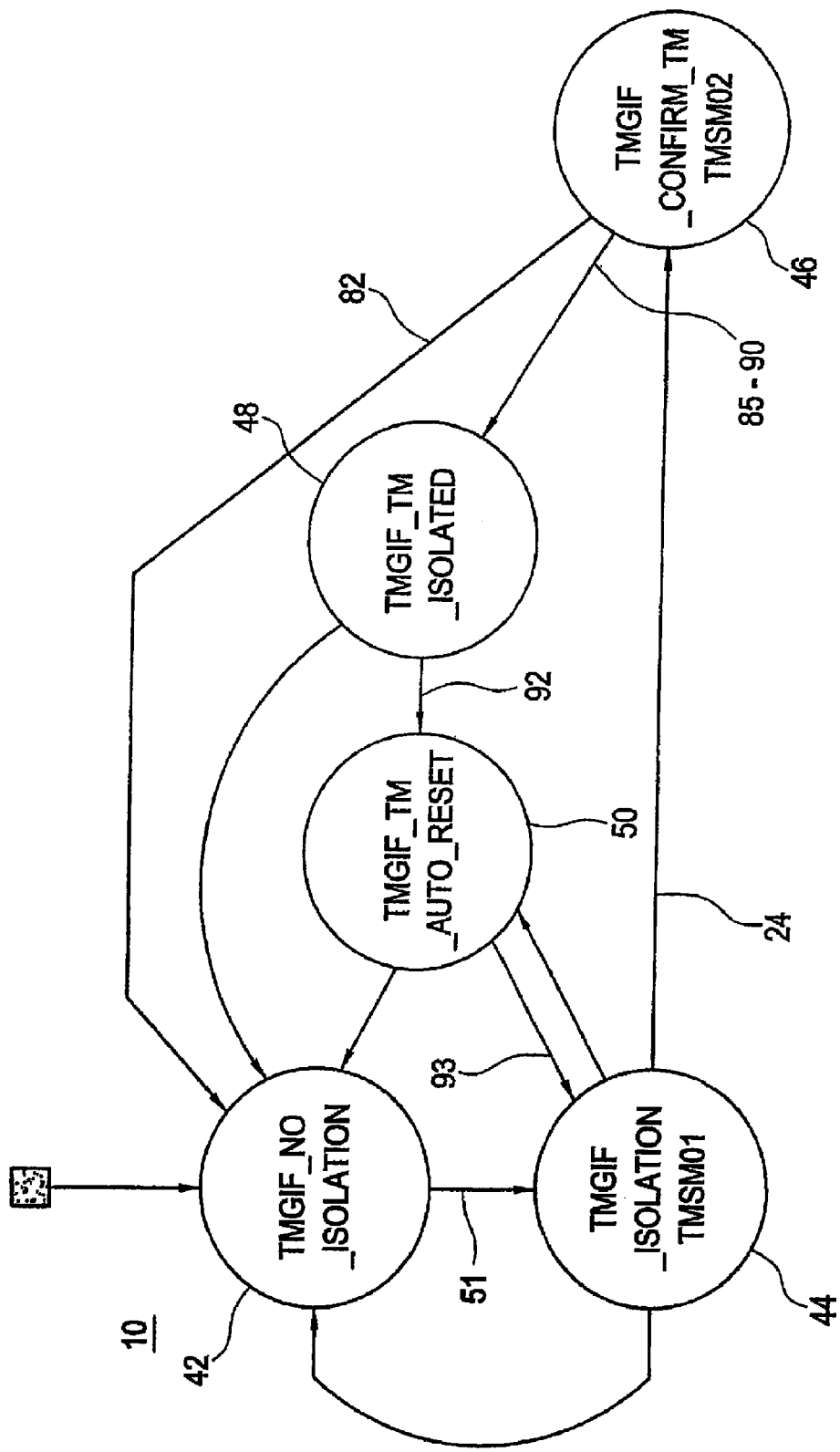
FIG. 3 is an exemplary diagram of an AC Ground Isolation State Machine.

FIG. 3 is an exemplary flow chart of the AC Ground Isolation State Machine. This state machine 10 is started whenever an AC ground is detected when the propulsion system 22 is either braking or motoring. The isolation process discussed below will continue until a conclusion is arrived at or an operator takes the unit out of a powered mode. This top state machine 10 controls the sub machines discussed below. This state machine 10 is used when an AC ground impedance change is detected in either any of the traction motors 1, 2, 3, 4, 5, 6, or alternator 24. The state machine 10 comprises a "No Isolation" or a first state 42, an "Isolation" or a second state 44, a "Confirm" or a third state 46, an "Isolated" or a fourth state 48, and a fifth "Auto Reset" state 50. The system starts in the "No Isolation" state 42 until an AC ground is detected. When an AC ground signal is detected, during either braking or motoring, the state machine 10 transitions 51 to the Isolation state 44 which has a sub state machine, which is further illustrated in FIG. 4.

Figure 4:
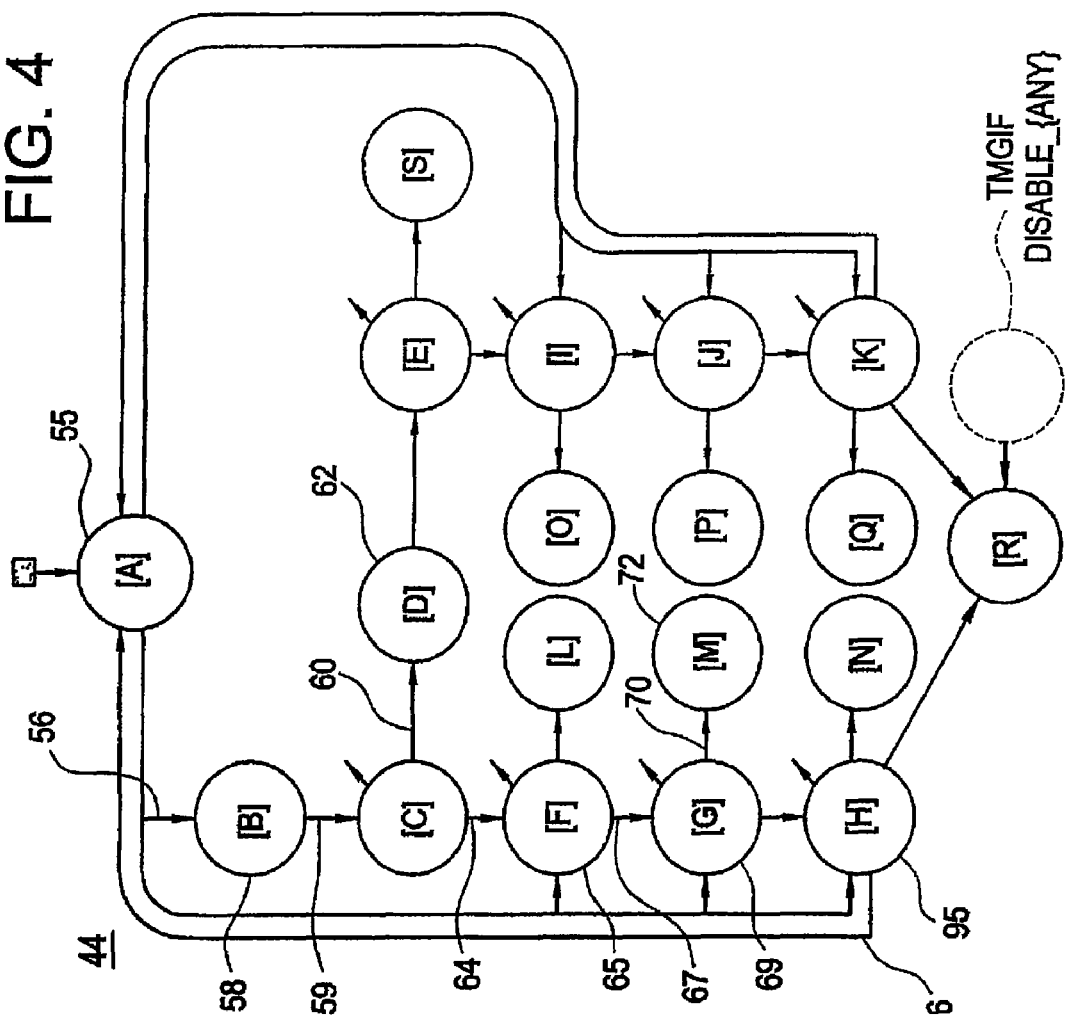
FIG. 4 is an exemplary diagram of an AC Ground Isolation Sub State Machine.

To best explain how the state machine 10 and sub state machines function, the following is an exemplary illustration. FIG. 4, in one embodiment, performs a binary sort of the traction motors 1, 2, 3, 4, 5, 6 and attempts to either suspect a traction motor or isolate the traction alternator 24. This is done by disabling traction motors to observe whether or not the ground goes away when a specific motor is disabled. Thus, the sub state machine 44 starts in a Setup state 55, and transitions based on the top-level state machine going into the Isolation state 44. At that point, the sub state machine 44 of FIG. 4 transitions 56 to a "Disable 1 through 3" Setup state 58, which means that the system is about to turn off or disable traction motors 1, 2, and 3.

In operation, the "Disable 1-2-3" Setup state 58 is really sending signals to begin reducing torque on the motors 33, 35, 37 before each is disabled, as will be discussed in more detail below with respect to FIG. 16. At transition 59 once the torque is at an acceptable limit, the motors 33, 35, 37 are turned off, or disabled, while motors 4, 5, and 6 are still running. The sub state machine 44 then looks for the ground signal again. If the ground is still detected, then the sub state machine 44 concludes that the ground was not in motors 1, 2 and 3 and transitions 60 to a "Disable 4, 5, and 6" Setup sub state. If a ground is not detected, then the system concludes that the ground is in either traction motors 1, 2, or 3.

As discussed previously, for illustration purposes only, assume the failure is in traction motor 2. Following this assumption, once the ground is no longer detected, the next step is to disable, or turn off, motor 1 by transitioning 64 to the "Disable 1" sub state 65, which turns motors 2 and 3 back on or enables and the only motor not running or disabled is motor 1. In this state, the sub machine 44 again makes a determination as to whether a ground is detected. If a ground is detected, then the sub machine 44 concludes that the ground is not in motor 1 and transitions 67 to a "Disable Motor 2" sub state 69, which turns motor 1 back on, leaves motor 3 on or enabled, and now disables motor 2. Thus, at this point, motors 1, 3, 4, 5, and 6 are on. Now in the "Disable Motor 2" sub state 69, the sub state machine 44 will try to detect the ground again. Assuming that Motor 2 has the ground, the sub state machine 44 will not register a ground, thus concluding that motor 2 is suspected of having a problem. The sub state machine 44 transitions 70 to the "Suspect 2" sub state 72, which reports that Motor 2 is suspected of having the problem.

Figure 5:
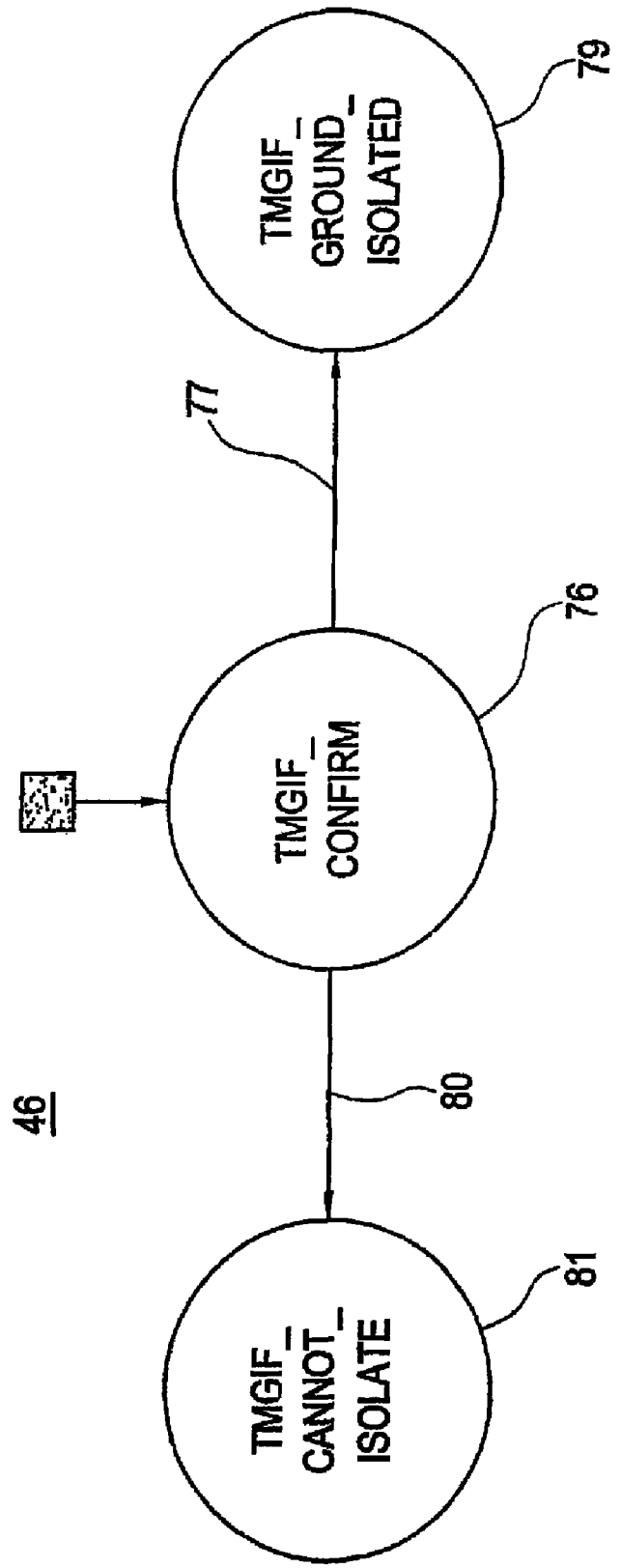
FIG. 5 is an exemplary diagram of an AC Ground Isolation Confirmation Sub State Machine.

Referring back to FIG. 3, the state machine transitions 74 to the "Confirm" state 46, which is illustrated in detail in FIG. 5. This transition 74 occurs only when the isolation state sub machine 44 suspects a component. In this sub state 46 illustrated in FIG. 5, since this sub state 46 knows that motor 2 is the suspected motor, it will enter a "Confirm" sub state 76 and command the sub machine 46 to turn Motor 2 back on or to enable motor 2. If the ground is still detected, the sub state machine 46 transitions 77 to a "Ground Isolate" sub state 79. If the ground is not detected, the sub state machine 46 transitions 80 to a "Cannot Isolate" sub state 81. Referring to FIG. 3, when the "Cannot Isolate" sub state 81 is reached, the "Confirm" sub state transitions 82 to the "No Isolation" sub state 42, where the system will go through the state machine 10 again if a ground is still being detected.

Referring to FIG. 3, the state machine 10 transitions 85, 86, 87, 88, 89, 90 from the "Confirm" state 46 to the "Isolated" state 48. Transition states 85, 86, 87, 88, 89, 90 are representative of each axle or each traction motor 1, 2, 3, 4, 5, 6. In the illustration presented, the state machine 40 would use transition 86, which is for traction motor 2. The state machine 40 will remain in the "Isolated" state 48 until the restriction imposed on motor 2 is reset. This restriction can be reset by an operator, by the state machine 10, or by a supervisory controller (not shown). The operator may want to reset the restriction if he has made a change to the system which he suspects will correct the problem detected. In a preferred embodiment, the operator would have access to a button or data entry codes that reset the restriction.

Because the restriction may have resulted from a condition, which may be correctable by operation of the propulsion system 22, such as a moisture-related failure or evaporation of a contaminant, it is preferable to determine that it is not a transitory kind of ground. Therefore, the state machine 10 will remain in the "Isolated" state 48 for a specified time period, such as two minutes, before the state machine 10 automatically resets itself. After the given time period passes, the state machine 10 transitions 92 to an "Auto Reset" state 50. The state machine 10 will remain in this state 50, and if the ground is detected again, the state machine 10 will transition 93 back to the "Isolation" state 44.

Transition 93 includes a variable that remembers which axle or motor was previously isolated or suspected of having the ground. Thus, when the state machine 10 returns to the "Isolation" state 44, it does not go through the whole sub state machine 44 processes again, but instead moves right to the state specific to the motor detected originally. Even if the operator manually resets the state machine 10, if the ground is still detected, the state machine 10 will return to the "Isolation" state 44 and to the state specific to the axle or motor that triggered the system 8 originally. Thus, referring to FIG. 4, the sub state machine 44 will jump to the "Disable 2" sub state 69 and then the "Suspect 2" sub state 72 if the ground is still found. Referring to FIG. 3, the state machine 10 would then transition 74 to the "Confirm" state 46. Since the state machine 10 has now detected the trouble in the same motor, when this motor is eventually isolated, in the "Isolated" state 48, the state machine 10 will allow a reset only after a longer period of time, such as an hour.

If the ground is not in the same motor, the sub state machine 44, FIG. 4, will then transition to the next motor disable state in the sub state machine 44, for example, "Disable 3" state 95. If the ground is still detected, the sub state machine 44 will transition 96 to the "Setup" state 55 and start searching for the ground again from the beginning. In the process of searching all of the traction motors, the sub state machine 44 will also verify that AC ground detection is not detected in the alternator 24.

Thus, sub state machine 44 disclosed in FIG. 4 checks whether there is previous information or not. If there is no previous information, it performs a search, such as a binary search, and then proceeds to a search of each motor 1, 2, 3, 4, 5, 6 and the alternator 24. If previous information is available, the sub state machine 44 uses that information as a starting position.

Figure 17:
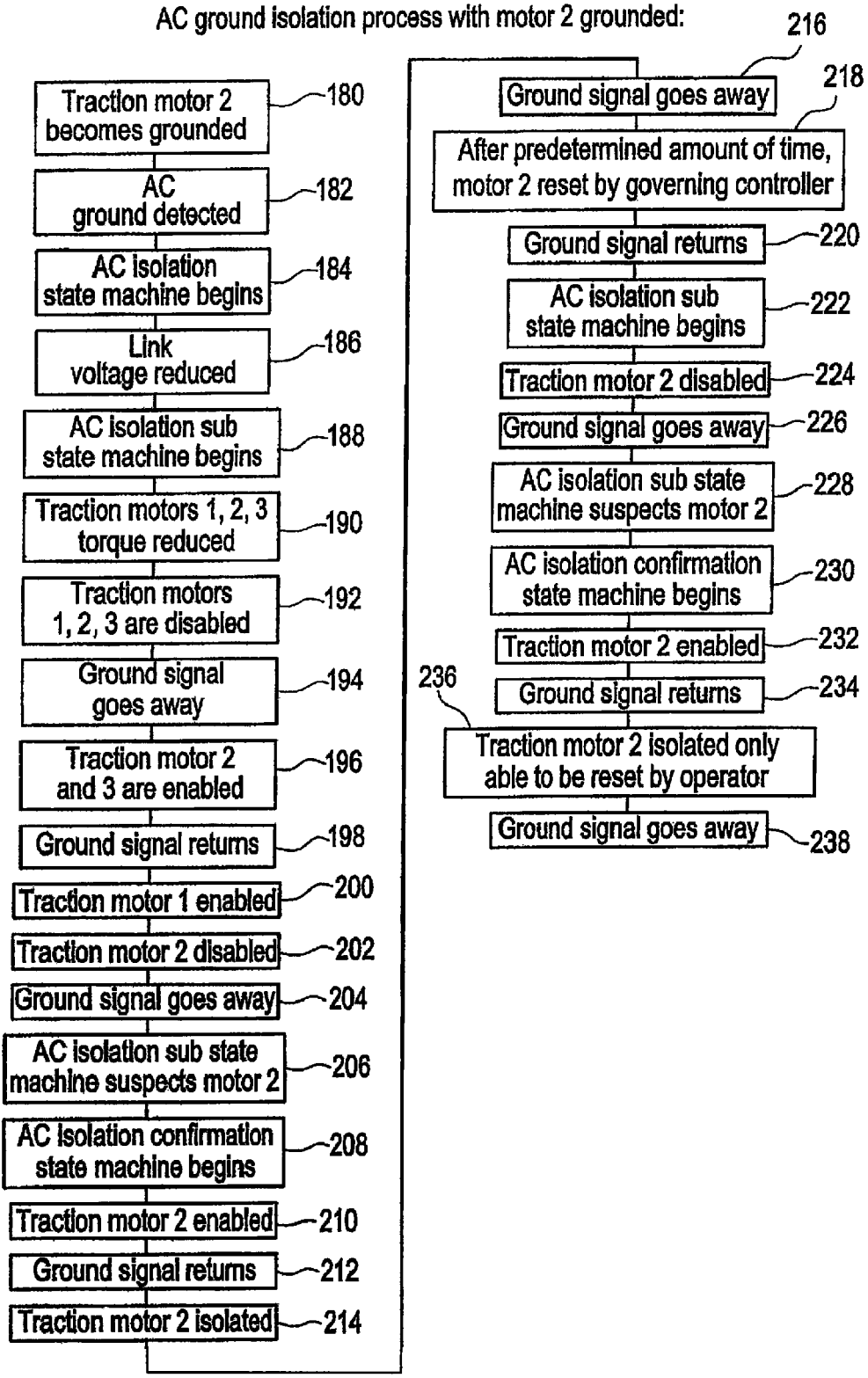
FIG. 17 is an exemplary process flow further illustrating the AC ground isolation state machine.

FIG. 17 is an exemplary process flow illustrated to further understand the AC ground isolation state machine based on the example discussed above. A traction motor 2 becomes grounded, step 180, and an AC ground is detected, step 182. The AC isolation state machine begins, step 184 where the link voltage is reduced, step 186, and the AC isolation sub state machine begins, step 188. The torque on traction motors 1, 2, and 3 are then reduced, step 190 and then these traction motors are disabled, step 192. If the ground signal goes away or is no longer detected, step 192, traction motor 2 and 3 are enabled, step 196. If the ground signal returns, step 198, traction motor 1 is enabled, step 200 and traction motor 2 is disabled, step 202. If the ground signal goes away again, step 204, the AC isolation sub state machine suspects motor 2, step 206, and enters the AC isolation confirmation state machine, step 208. Traction motor 2 is enabled, step 210, to see if the ground returns, step 212. Detecting the ground again, traction motor 2 is isolated, step 214, and the ground signal goes away again, step 216. After a predetermined amount of time, traction motor 2 is reset by a governing controller, step 218. If the ground signal then returns, step 220, the AC isolation sub state machine begins again, step 222. Instead of going through each motor again, the sub state machine begins by disabling traction motor 2, step 224. If the ground goes away, step 226, the AC isolation sub state machine suspects motor 2, step 228, and the AC isolation confirmation state machine begins, step 230. Traction motor 2 is enabled again, step 232. If the ground signal returns, step 234, traction motor 2 is isolated where it is only able to be reset by an operator, step 236, and thus the ground signal goes away, step 238.

Figure 6:
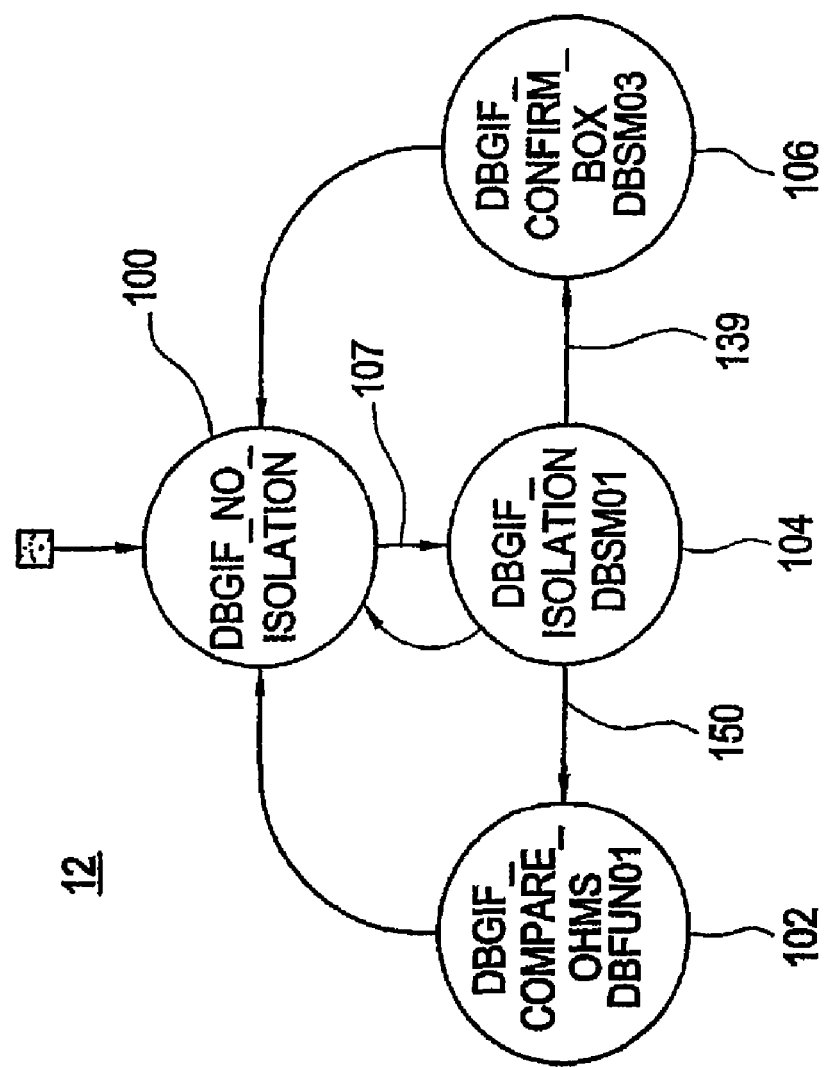
FIG. 6 is an exemplary diagram of a DC Ground Isolation State Machine.

FIG. 6 is an exemplary embodiment of a DC ground isolation state machine. This state machine 12 is started whenever a DC ground is detected in either ready power, brake setup, braking or self-load. This isolation process will continue until a conclusion is reached or the operator takes the unit out of a powered mode. This top state 12 machine controls the sub state machines discussed below. This state machine comprises a "No Isolation" state 100, an "Isolation" state 104, a "Confirm Box" state 106, and a "Compare Ohms" state 102. To best illustrate how this state machine 12 operates, assume a ground has developed on grid box 102. Once a ground is detected, the state machine transitions 107 from a "No Isolation" state 100 to an "Isolation" state 104. The "Isolation" state 104 is further detailed in FIG. 7. This sub state machine 104 performs a sequential search of the grid boxes 102, 103, 104 and attempts to either suspect a grid box or the DC bus and inverters. It will then disable grid boxes in such a manner that only one grid box is in the circuit 22 at a time where an observation will be made if the ground is present at that time. The sub state machine 104 first enters a "Count Boxes" or first sub state 110 to determine the number of boxes, or grids, that are actually in the propulsion system 22. In one embodiment, if the propulsion system 22 comprises only one grid or box, the sub state machine 104 does not need to go through any sort of isolation process and would simply transition 111 to a "Suspect Sub" sub state 115.

Figure 7:
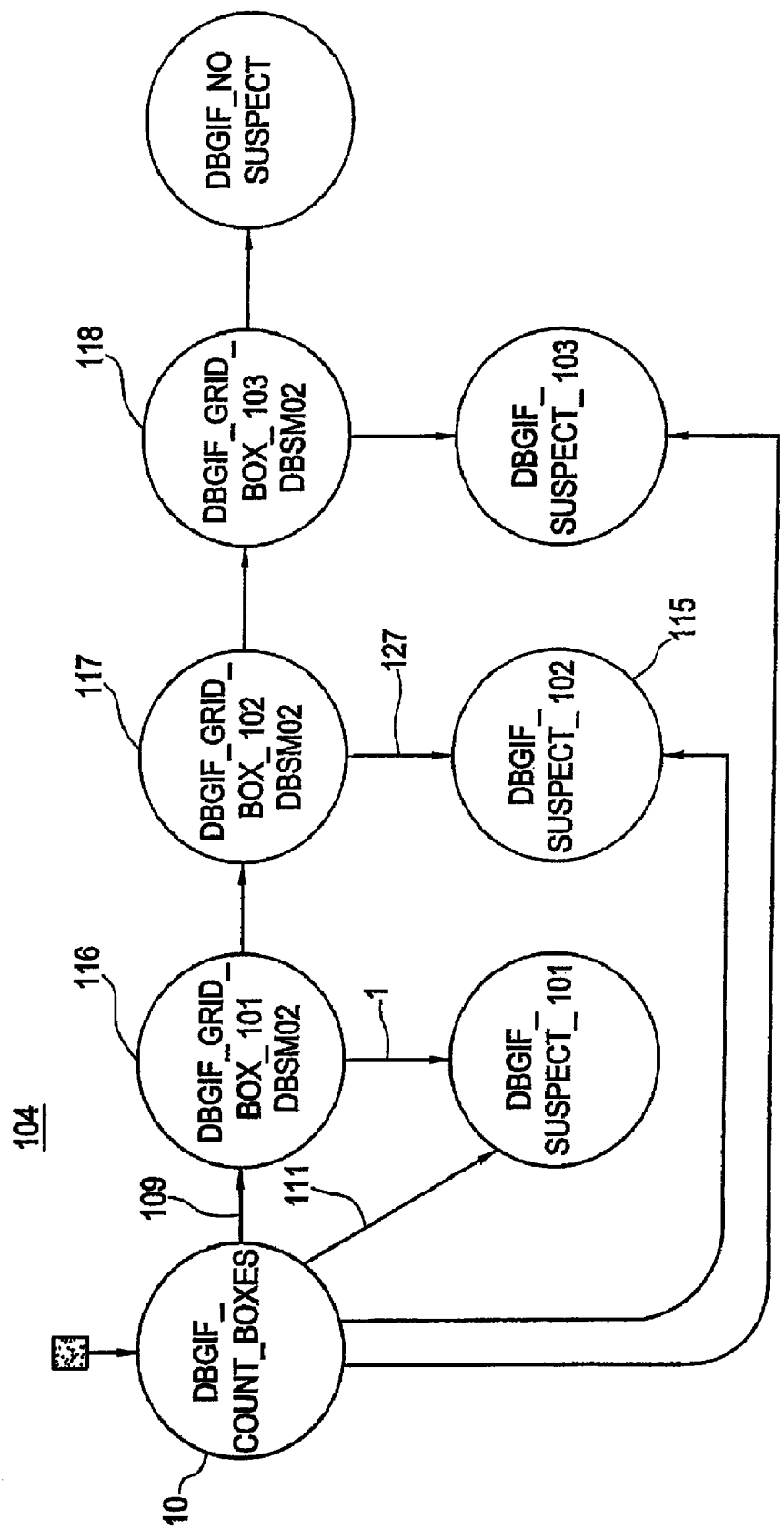
FIG. 7 is an exemplary diagram of a DC Ground Isolation Sub State Machine.
Figure 8:
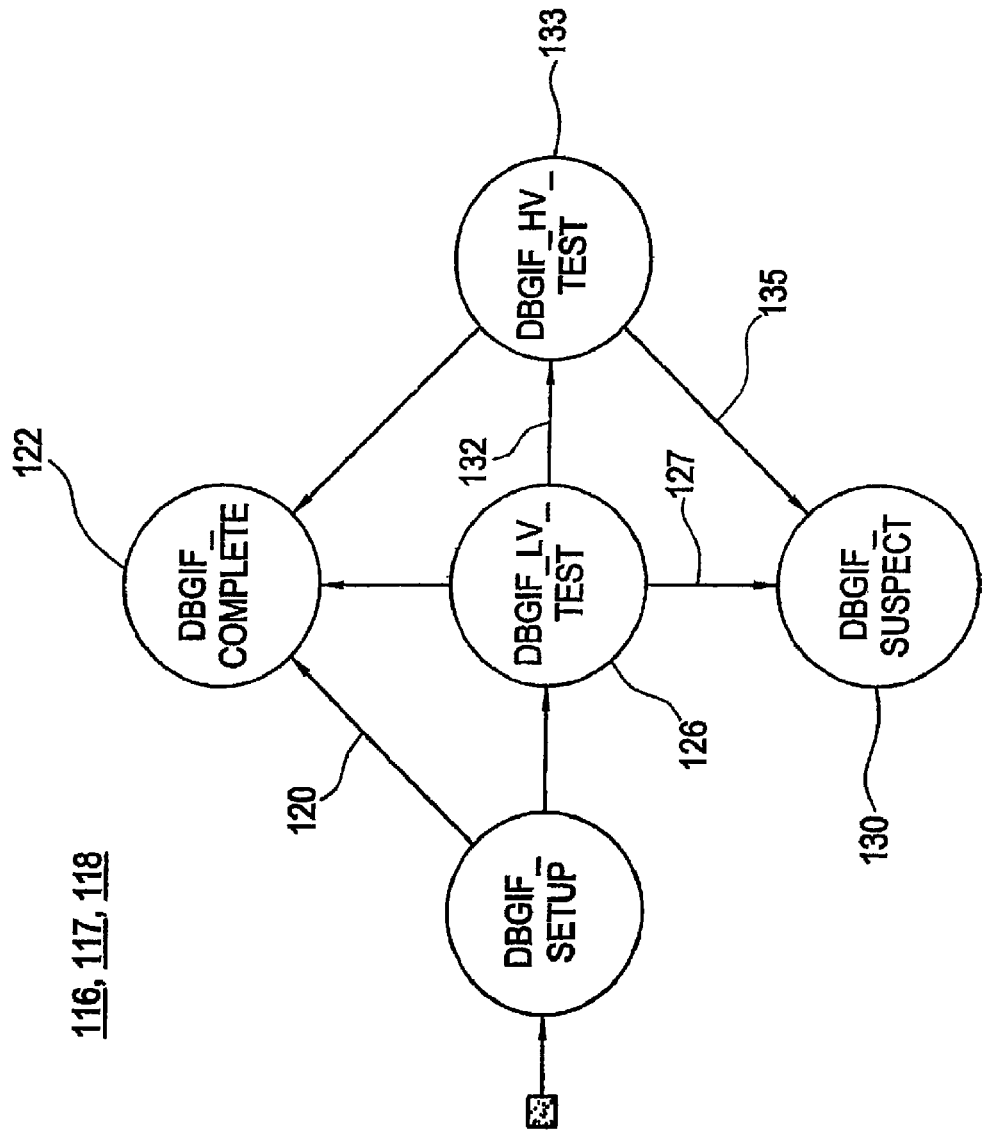
FIG. 8 is an exemplary diagram of a DC Ground Isolation Grid Box Sub State Machine.

But where multiple grid boxes exist, such as three as illustrated in FIG. 7, the sub state machine 104 will examine each box, at either a "Grid Box 101" state 116, a "Grid Box 102" state 117, or a "Grid Box 103" state 118. The grid boxes not being examined in any of these given states are turned off. An exemplary example of each "Grid Box" sub state 116, 117, 118 is illustrated in FIG. 8. This sub state machine 116, 117, 118 is reused for each grid box. Transitioning to this sub state machine 116, 117, 118 disables the other grid boxes in the propulsion system 22. The sub state machine 116, 117, 118 will transition 120 to a "Complete" sub state 122 if the grid box being examined has already been restricted previously. For example, referring back to FIG. 7, if Grid Box 101 was disabled previously, and a DC ground was detected, the system 8 would again start by analyzing Grid Box 101, but when detecting a restriction on Grid Box 101, it will transition 120 to the "Complete" state 122 in FIG. 8.

Again, assuming that the ground is in Grid Box 102, after analyzing Grid Box 101, the state machine would then analyze Grid Box 102 using the "Grid Box 102" sub state 117. The sub state machine 117 would first perform a low voltage test as part of the "Low Voltage Test" state 126. In one embodiment, the grid box is provided with a limited voltage, such as 875 volts, and then looks for a DC ground signal. The reason for a low voltage test is to reduce a chance of fire or severely damaging the grid box.

If the grid box fails the low voltage test, or in other words, a ground is detected, the sub state machine 117 transitions 127 to a "Suspect" sub state 130. If the grid box passes the low voltage test, the sub state machine 117 transitions 132 to a "High Voltage Test" state 133. If the grid box fails the high voltage test, or detects a ground, the sub state machine 117 transitions 135 to the "Suspect" sub state 130. Referring back to FIG. 7, the parent sub state machine 104 would then transition 127 to the "Suspect 102" sub state 115. Referring back to FIG. 6, the state machine 12 transitions 139 to a "Confirm Box" state 106. The "Confirm Box" state 106 is further disclosed in FIG. 9.

Figure 9:
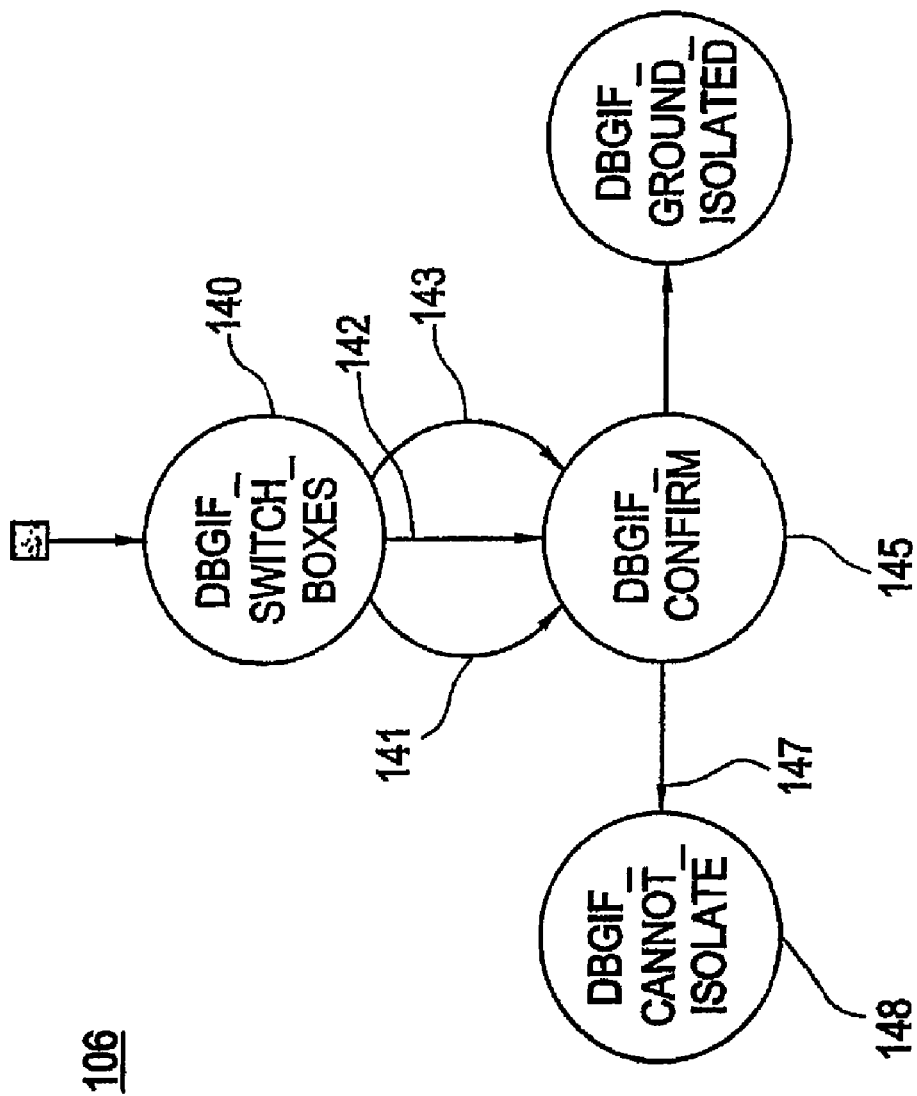
FIG. 9 is an exemplary diagram of a DC Ground Isolation Confirmation Sub State Machine.

As illustrated in FIG. 9, the grid boxes in which a ground was not detected are turned back on or enabled. This is done in the "Switch Boxes" sub state 140 where the suspect grid box is left off or disabled and the sub state machine 106 transitions 141, 142, 143 the other two grid boxes, in this case, using transitions 141 and 143, to a "Confirm" sub state 145. If a ground is still detected, the sub state machine 106 transitions 147 to a "Cannot Isolate" state 148, and the state machine 12 concludes that the ground is somewhere else in the propulsion system 22. Referring back to FIG. 6, the state machine 12 transitions 150 to the "Compare Ohms" state 102, which is also known as the Dynamic Braking Grid Failure Isolation State Machine.

Figure 18:
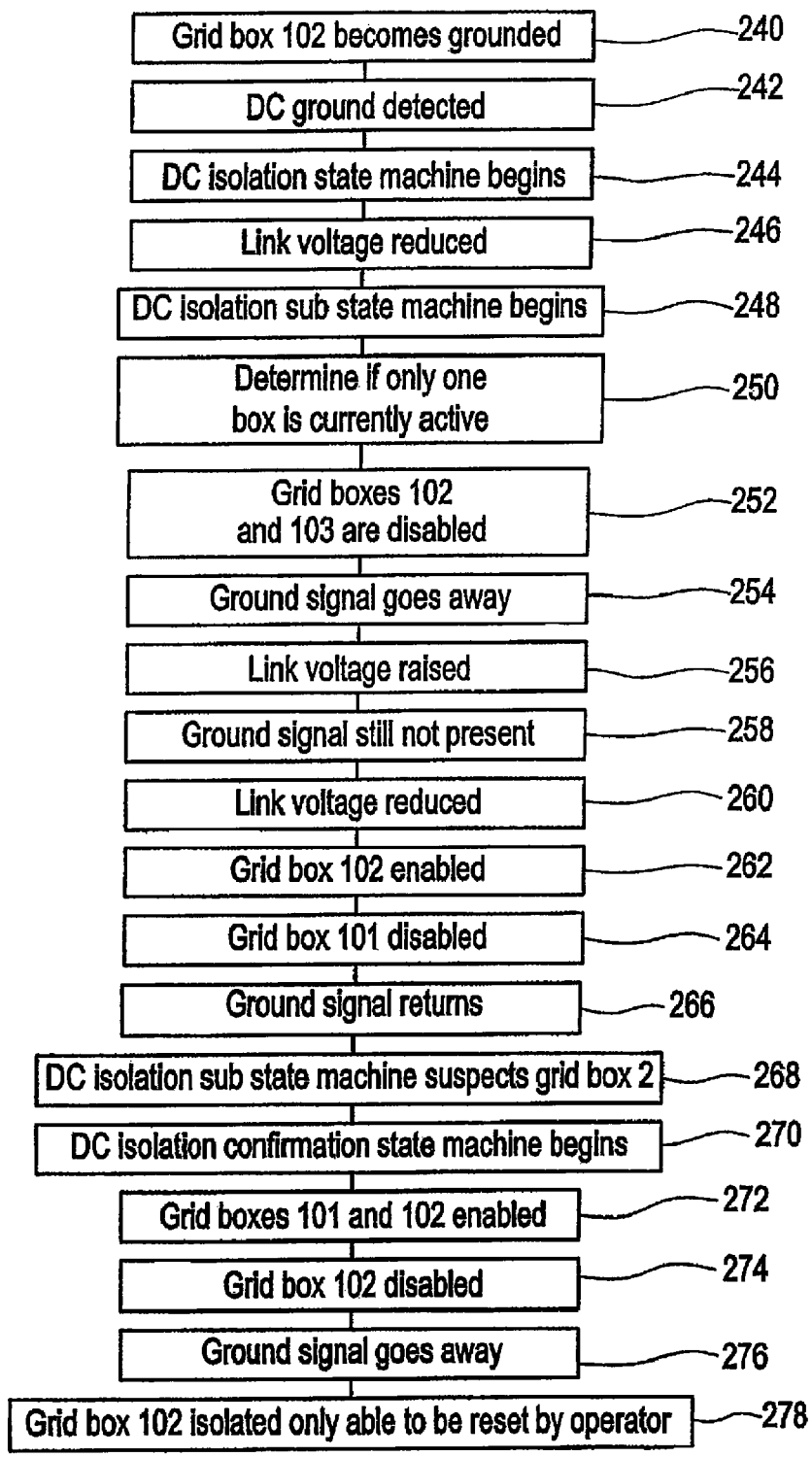
FIG. 18 is an exemplary process flow further illustrating the DC ground isolation state machine.

FIG. 18 is an exemplary process flow illustrated to further understand the DC ground isolation state machine based on the example discussed above. A grid box 102 becomes grounded, step 240, and a DC ground is detected, step 242. The DC isolation state machine begins, step 244, where the link voltage is reduced, step 246, and the DC isolation sub state machine begins, step 248. Next, a determination is made as to if only one box is currently active, step 250. Grid boxes 102 and 103 are then disabled, step 252. If the ground signal goes away or is no longer detected, step 254, the link voltage is raised, step 256. If the ground signal is still not present, step 258, the link voltage is reduced, step 260, and grid box 102 is enabled, step 262, while grid box 101 is disabled, step 264. If the ground signal returns, step 266, the DC isolation sub state machine suspects grid box 102, step 268, and enters the DC isolation confirmation state machine, step 270. Grid boxes 101 and 103 are enabled, step 272, and grid box 102 is disabled, step 274, to see if the ground goes away, step 276. Grid box 102 is isolated and is only able to be reset by the operator, step 278.

Figure 10:
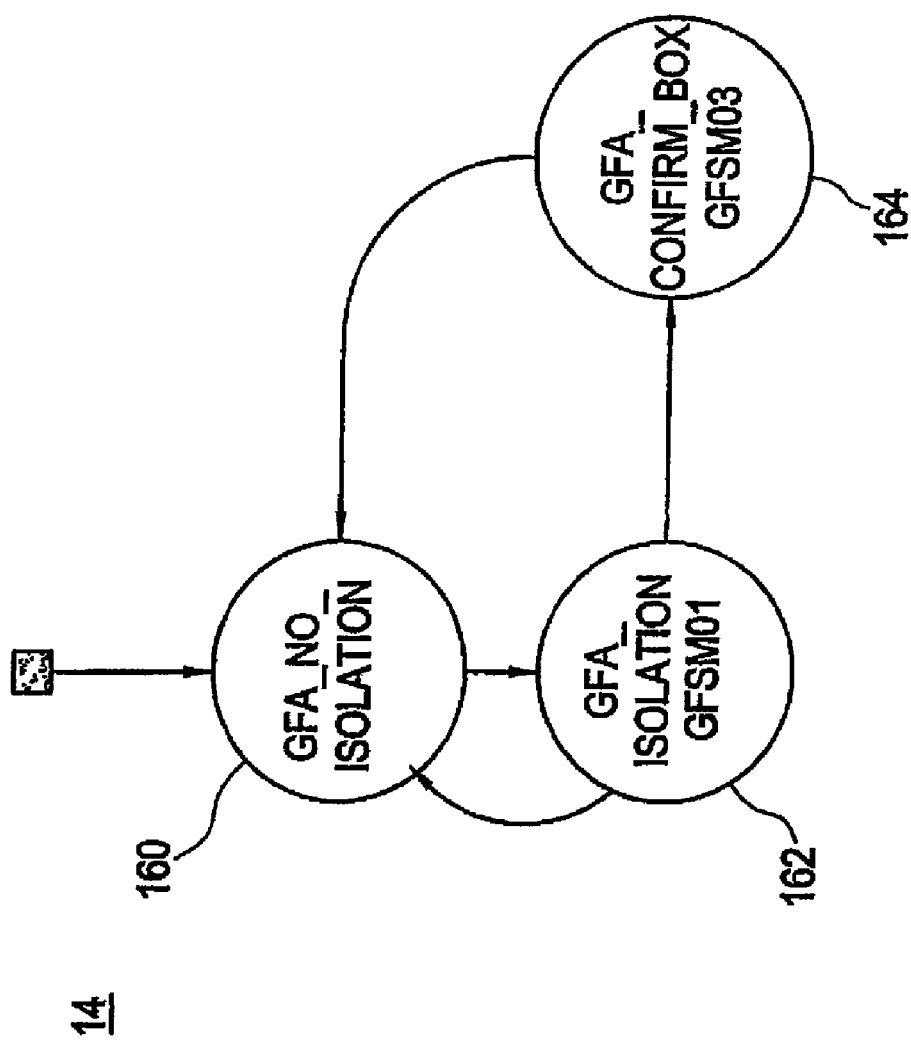
FIG. 10 is an exemplary diagram of a Dynamic Braking Grid Failure Isolation State Machine.

FIG. 10 is an exemplary embodiment of the Dynamic Braking Grid Failure Isolation State Machine. This state machine 14 is similar to the DC Ground Isolation State Machine 12, except here the state machine is detecting changes in grid resistance instead of ground current feedbacks. Additionally, since this state machine 14 is detecting grid resistance changes, the "Compare Ohms" state 102 of the DC Ground Isolation State Machine is not present. Thus, this state machine 14 comprises a "No Isolation" state 160, an Isolation state 162, and a Confirm Box state 164. This state machine 14 is started whenever a significant change in a resistance ratio of estimated to modeled aggregate grid resistance is detected in either braking or self-load. A modeled resistance is a nominal resistance value based on a circuit configuration with adjustments for thermal considerations, such as tolerance. An estimated resistance is a calculated value of resistance based on a power, voltage, or current feedback in the circuit. A resistance ratio is the estimated resistance divided by the modeled resistance. The isolation process will continue until a conclusion is reached or the operator takes the unit out of a powered mode. This top state machine 14 controls the sub state machines illustrated in FIGS. 11-13.

Figure 11:
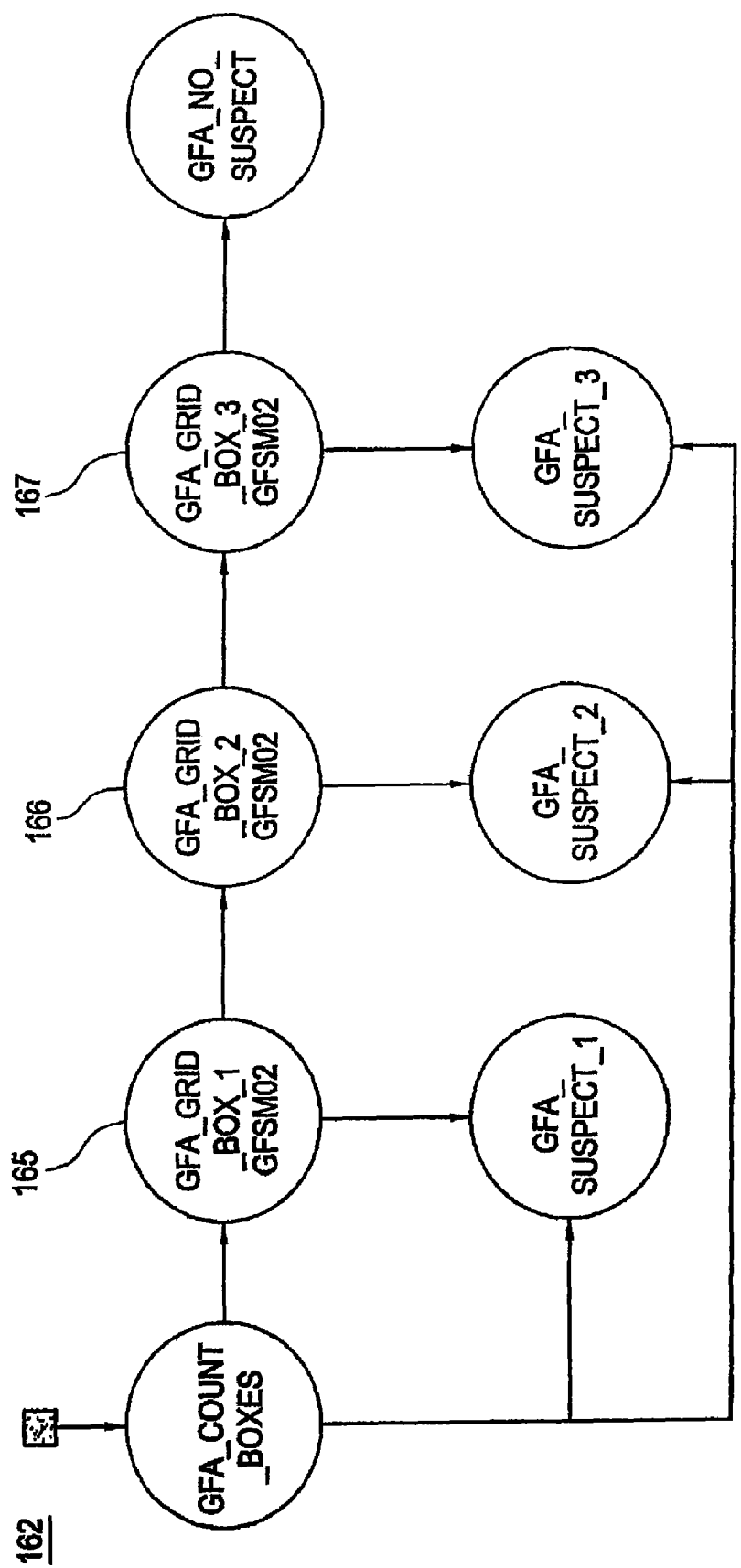
FIG. 11 is an exemplary diagram of a Dynamic Braking Grid Failure Isolation Sub State Machine.
Figure 12:
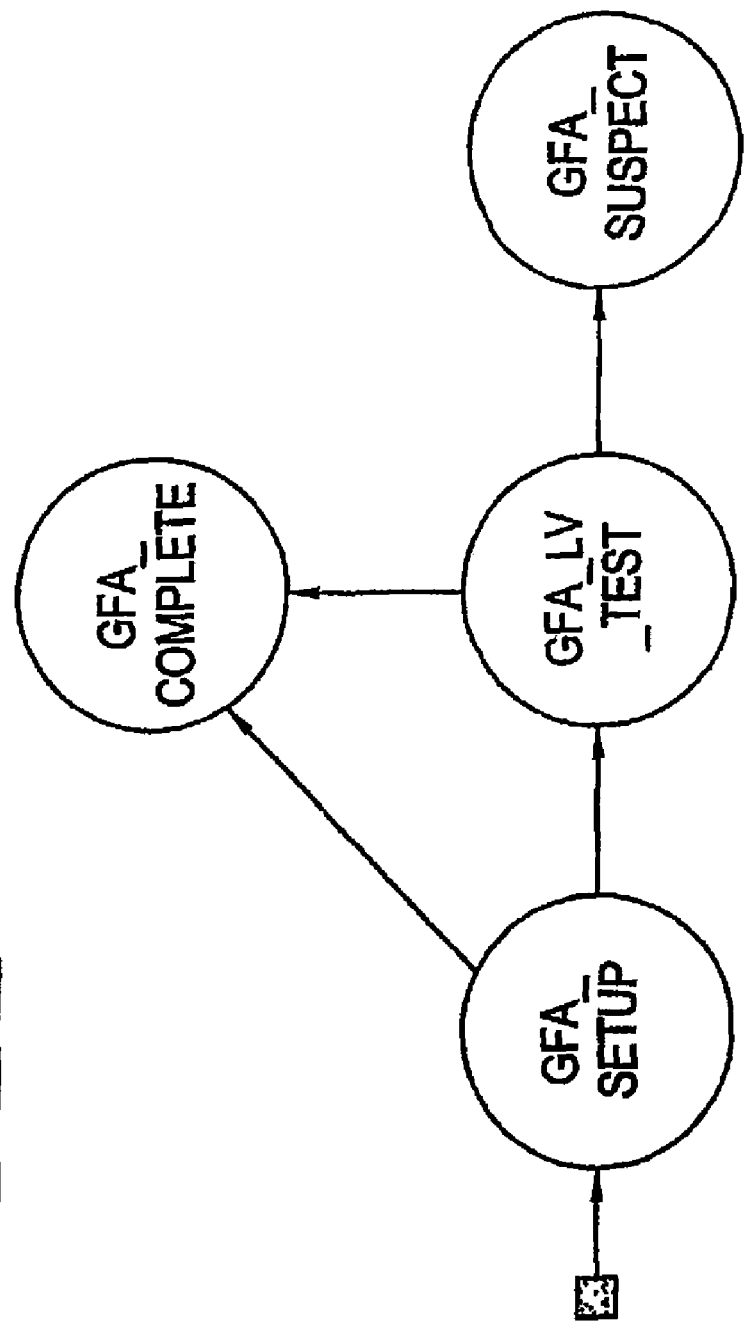
FIG. 12 is an exemplary diagram of a Dynamic Braking Grid Failure Isolation Grid Box Sub State Machine.
Figure 13:
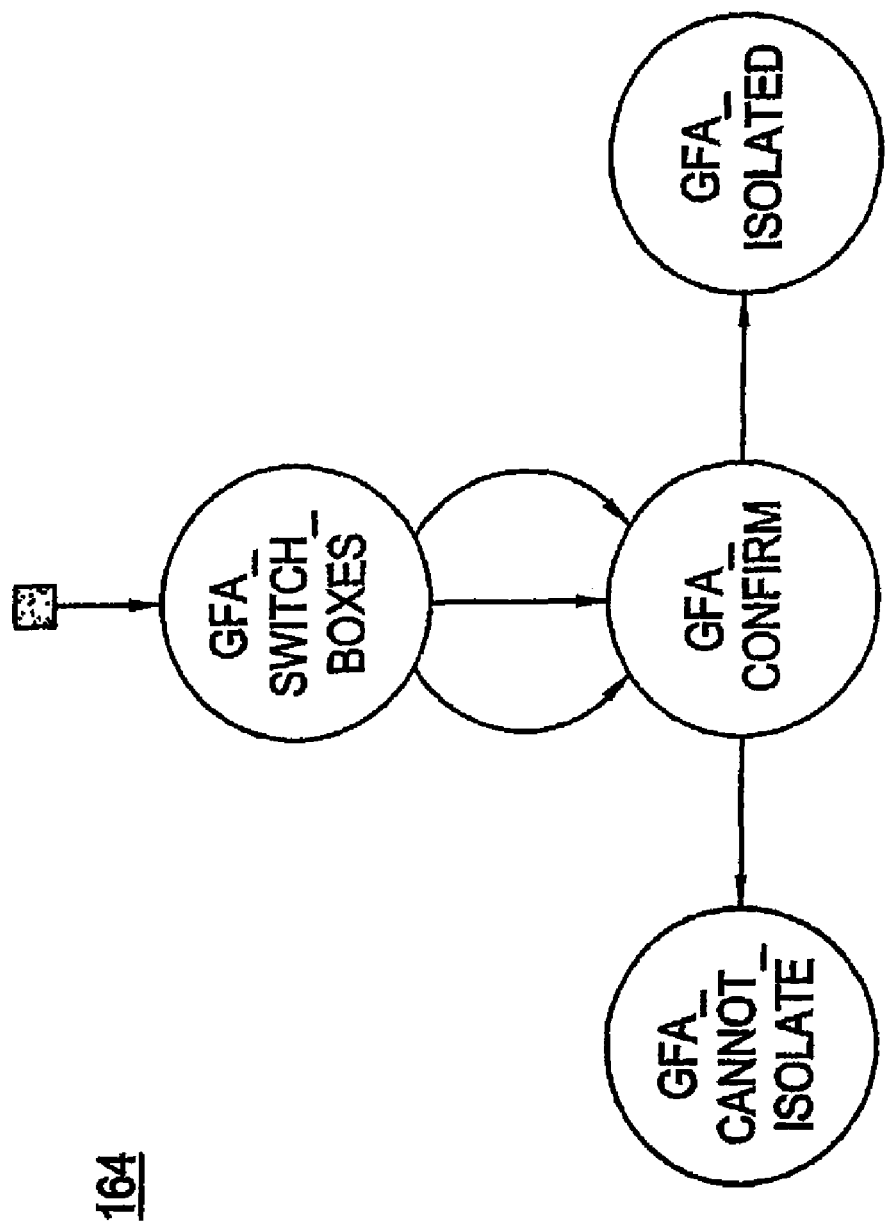
FIG. 13 is an exemplary diagram of a Dynamic Braking Grid Failure Isolation Confirmation Sub State Machine.

Similar to FIG. 7 of the DC Ground Isolation State Machine, FIG. 11 illustrates a sub state machine 162 that performs a sequential search of the grid boxes and attempts to suspect a grid box. It disables grid boxes so that only one grid box is in the circuit at any given time and observes if the grid resistance ratio is significantly in error at that time. Similar to FIG. 8 of the DC Ground Isolation State Machine, FIG. 12 illustrates a sub state machine that is reused for each grid box. This sub state machine 165, 167, 168 first ensures that only the grid box intended by the parent state 162 machine is on. Upon confirmation of this fact, the state machine 14 observes for significant errors in the grid resistance ratio. If an error is found, the grid box is suspected. Likewise, if no error is detected, the grid box is not suspected. Similar to FIG. 9 of the DC Ground Isolation State Machine, FIG. 13 illustrates a sub state machine 164 that ensures that the suspected grid box is not operating in the propulsion circuit 22. Once this condition is met, and if the grid resistance ratio returns to an expected range, the suspected grid box is confirmed. If the grid resistance ratio is significantly in error though, the suspected grid box is left unrestricted.

Figure 19:
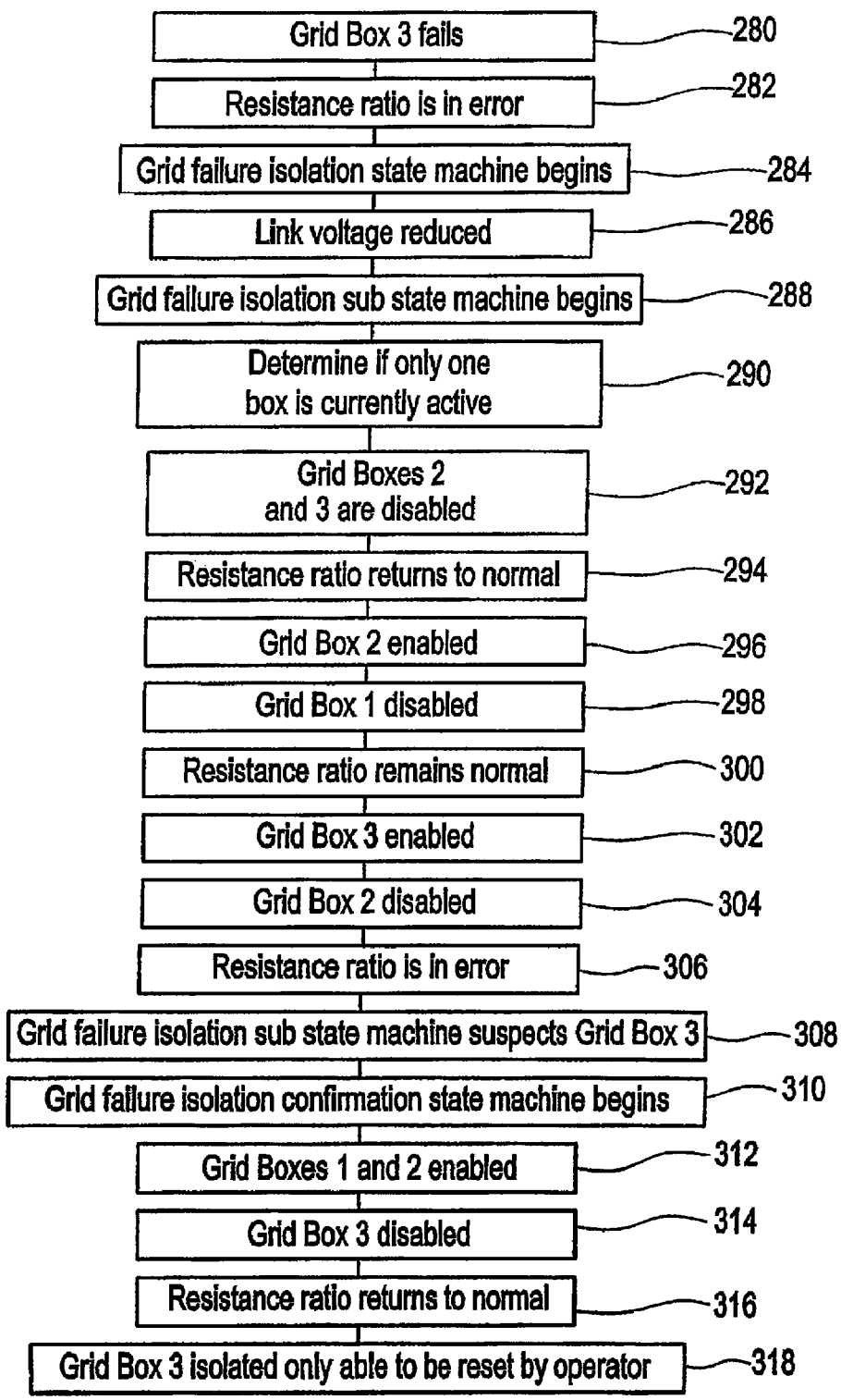
FIG. 19 is an exemplary process flow further illustrating the dynamic braking grid failure isolation state machine.

FIG. 19 is an exemplary process flow illustrated to further understand the dynamic braking grid failure isolation state machine based on the example discussed above. Grid box 103 fails, step 280, and a resistance ratio is in error, step 282. The grid failure isolation state machine begins, step 284, where the link voltage is reduced, step 286, and the grid failure isolation sub state machine begins, step 288. Next, a determination is made as to if only one box is currently active, step 290. Grid boxes 102 and 103 are then disabled, step 292. If the resistance ratio returns to normal, step 294, grid box 102 is enabled and grid box 101 is disabled, steps 296-298. If the resistance ratio remains normal, step 300, grid box 103 is enabled, step 302, while grid box 102 is disabled, step 304. If the resistance ratio is in error, step 306, the grid failure isolation sub state machine suspects grid box 103, step 308, and enters the grid failure isolation confirmation state machine, step 310. Grid boxes 101 and 102 are enabled, step 312, and grid box 103 is disabled to see if the ground goes away, step 316. Grid box 103 is isolated and is only able to be reset by the operator, step 318.

FIG. 14 discloses the Dynamic Braking Grid Failure Early Detection algorithm. This algorithm 16 is applied to make an early determination regarding whether the braking grid has failed before using the state machines 10, 12, 14. More specifically, this logic is applied to detect obvious failures that could not wait for an isolation process to run. The combination logic takes into account the current state for a multitude of variables. There are two modes of operation for this algorithm 14. Either all grid boxes are in use, step 320, or less than a maximum grid boxes are in use. When all grid boxes are in use, certain minimum conditions are required. These minimum conditions are selected based on an accuracy of the sensors, models and erroneous detection possibilities. For example, a minimum horsepower, such as 500 Hp, a minimum voltage, such as 150 volts, a minimum blower speed, and a status of the propulsion system, such as being in a braking condition. With these requirement met, resistance ratios and blower speed comparisons under various conditions are observed and compared to models, in one embodiment maintained in a computer database, to determine anomalies that indicate immediate failure, steps 322-338.

For example, all blowers 30 should operate within similar parameters. If the system 8 detects a blower 30 that is not running a similar speed to the other blowers 30 and/or the resistance measured is also out of acceptable parameters, the system 8 will disable the grid containing this blower, step 332. If less than all grids are in use, FIG. 14 is applied. For example, if there are only two blowers in use, Label L, step 338, would be applied comparing the blower speed to a modeled blower speed to determine which blower is not functioning properly.

Figure 16A:
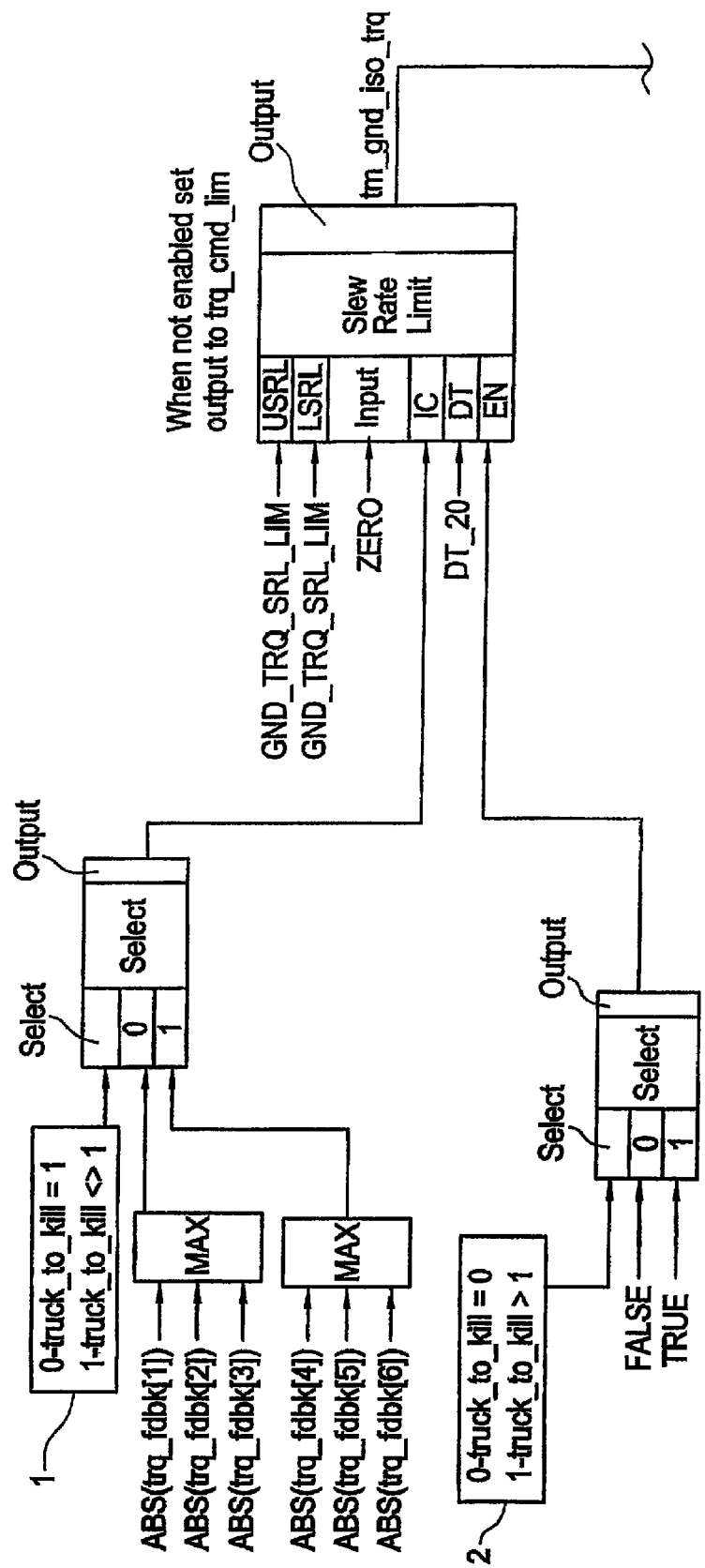
FIG. 16 is an exemplary diagram illustrating traction motor isolation per axle torque limit.
Figure 16B:
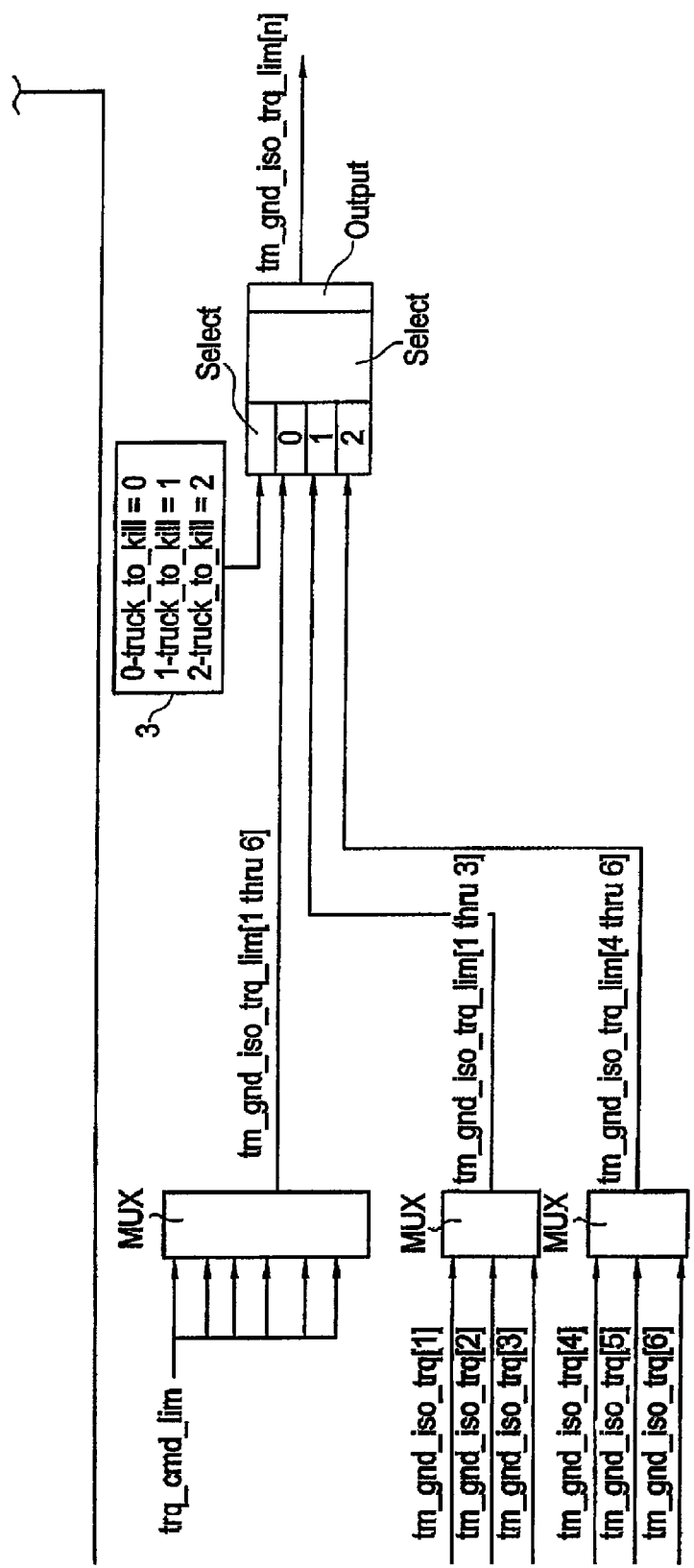

FIG. 16 illustrates the traction motor ground isolation per axle torque limit 20. This is specific to reducing torque on a motor before shutting down a truck, or traction motors 1, 2, 3, 4, 5, 6, so that the locomotive will not abruptly feel the change resulting from a loss of a truck, or combination of motors, such as motors 1, 2, and 3 as previously discussed. By doing this, the train or locomotive jerk is minimized. If this function were not performed then large train or locomotive jerks would occur whenever this system was implemented.

Detection of failures in resistors and any associated circuits, such as blowers, should be detected and isolated as quickly as possible. In one exemplary embodiment, to achieve quicker detection, an adaptation of the condemning limits on a sensed input over time is required. In another exemplary embodiment, this is accomplished by normalizing the feedback with respect to a variation stable variable. Such an adaptation removes long-term variation from the electrical system. Examples of variation sources include, but are not limited to, resistor manufacturing differences and sensor bias. In an exemplary embodiment, this adaptation is performed after every power-up of the control system. If done after every power-up, this allows users an opportunity to replace components without being concerned about previously remembered information by the controller.

In another exemplary embodiment, tighter detection is accomplished by compensating for failures or environmental condition in the system. An exemplary example is ground. Since ground can shift, absolute voltage levels to the analog hardware can reach common mode limits. Knowing when the hardware has no more capability to sense a failure as well as compensating the sensing when the information is still available is useful for quicker detection.

In another exemplary embodiment, quicker detection may be accomplished by understanding the previous range of a given signal. Such an approach is useful when there are multiple sensed signals in the system and there relative information is important. Since it may be nearly impossible to read all inputs into the controller synchronously, having an understanding of ranges is important. By doing so reduces transient signal movements from causing incorrect isolation due to differences in sampling time.

To reduce secondary damage during isolation of a failed component, use of power reduction is useful. Most often the source power to the dynamic braking resistors can be controlled more quickly than the actuator to remove the failed component. Thus, whenever a failure is detected, the power is reduced at the same time the failed component is commanded removed from the circuit.

Figure 20:
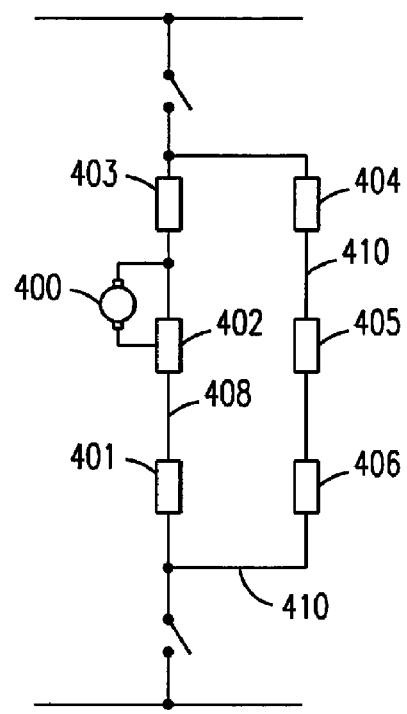
FIG. 20 depicts an exemplary embodiment of a present configuration of a resister braking grid used for dynamic braking.

FIG. 20 depicts an exemplary embodiment of a prior art configuration of a resister braking grid network used for dynamic braking. This exemplary grid has a blower 400 and a bank of resistors 401, 402, 403, 404, 405, 406. A first three resistors 401, 402, and 403, the entry grid, are in series 408 which are then in parallel with the three other resistors 404, 405, and 406, the exit grid 410, which are also in series. The blower 400 is typically connected to the first set of resistors 401, 402, 403 that are in series. Typically, the only sensed data is blower speed and the total circuit voltage. Though this exemplary illustration depicts a plurality of resistors, those skilled in the art will readily recognize that a grid network may consist of a single resistor.

Figure 21:
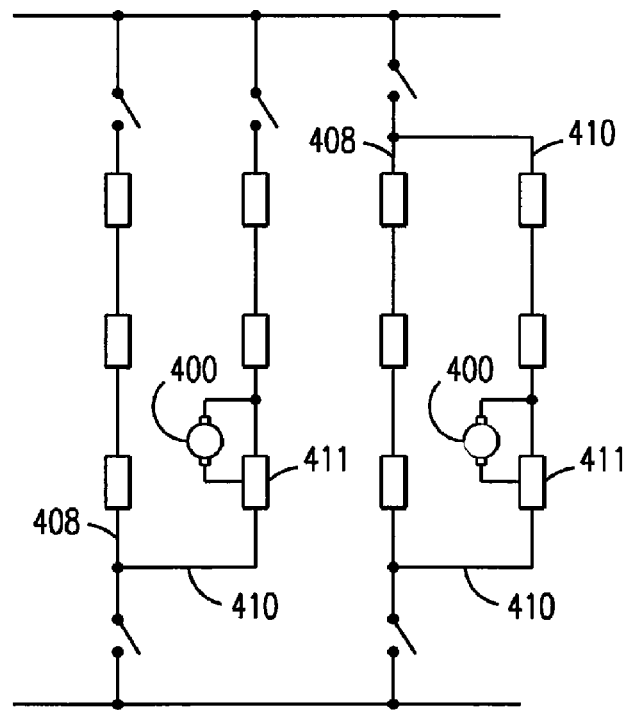
FIG. 21 depicts an exemplary embodiment of the blowers connected to exit grids.

FIG. 21 depicts an exemplary embodiment of two blowers connected to respective exit grids. In the illustration shown in FIG. 21, air is blown first over the first grid 408 and then the second grid 410. The second grid 410 is usually the hotter grid though. Since the second grid 410, which includes the second set of parallel resistors 404, 405, 406, is the hottest part of the system, these resistors 404, 405, 406 proportionally have a higher probably of failure. Connecting the blower to the second grid 410 allows failure detection based upon a speed signature of the blower which occurs when a resistor fails in this leg of the system.

Figure 22:
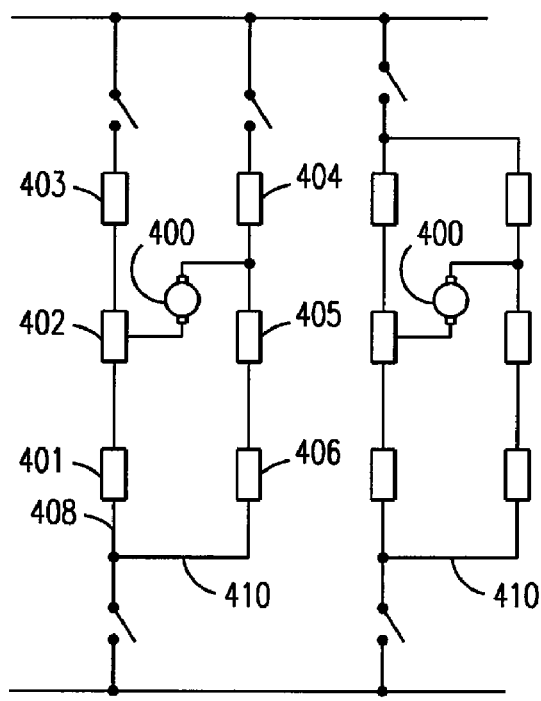
FIG. 22 depicts an exemplary embodiment of the present invention with a blower motor connected across two grid legs.

FIG. 22 depicts an exemplary embodiment of the present invention with a blower motor connected across two grid legs. Thus, the blower motor 400 is directly connected to both grid legs, 408, 410. Unlike prior art configurations and the embodiment discussed above, as illustrated, a failure in any resistor 401, 402, 403, 404, 405, 406 will affect the applied motor voltage. Thus, a failure is detected by the corresponding change in the blower speed. Those skilled in the art will readily recognize that failure is not limited to being determined by a change in blower speed. Measuring blower voltage and/or blower current can also be used to determine a failure. Towards this end, it should be readily apparent to those skilled in the art that though blower speed is disclosed, other measurable variables may be used to determine whether a failure is occurring.

Figure 23:
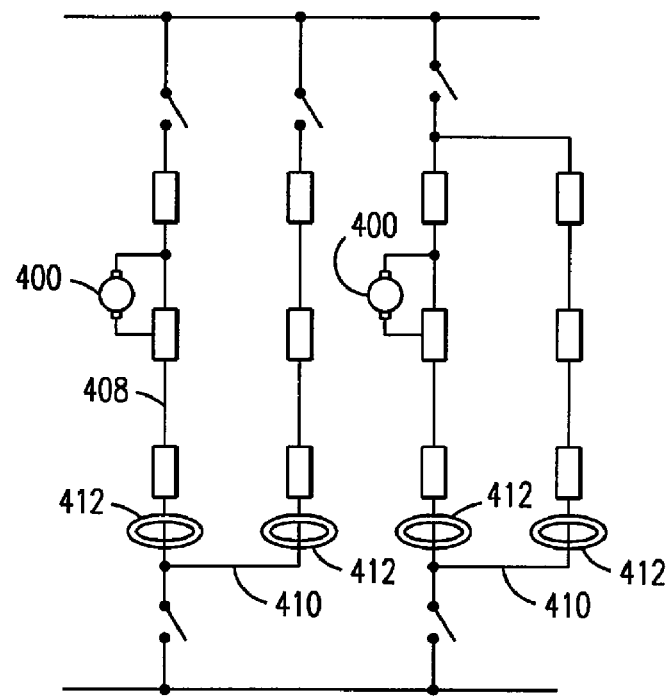
FIG. 23 depicts an exemplary embodiment of the present invention with current sensors in each grid leg.

FIG. 23 depicts an exemplary embodiment of the present invention with current sensors in each grid leg. Though the blowers 400 are illustrated as being connected to the first grid leg 408, those skilled in the art will readily recognize that this embodiment can also have the blower as configured in FIG. 21 or 22. A current sensor 412 in each grid leg 408, 410 allows for current monitoring. Towards this end, a resistor and/or motor failure will affect the resistance of the leg and will show up as a current change in that leg. This change may then be compared to other grid legs.

Figure 24:
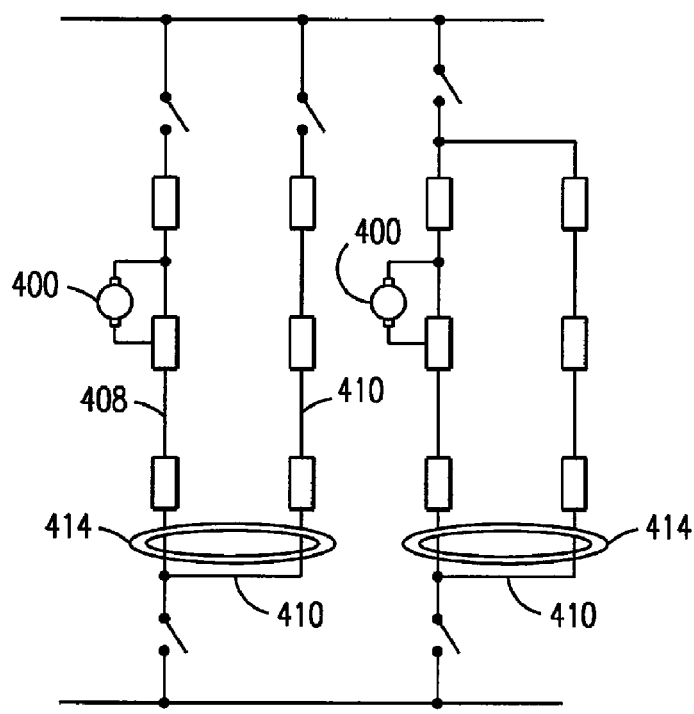
FIG. 24 depicts an exemplary embodiment of the present invention with a current sensor to measure a pair of grid legs.

FIG. 24 depicts an exemplary embodiment of the present invention with a current sensor to measure a pair of grid legs. As stated above, though the blowers 400 are illustrated as being connected to the first grid leg 408, those skilled in the art will readily recognize that this embodiment can also have the blower as configured in FIG. 21 or 22. Differential current sensor 414 are applied to a pair of grid legs 408, 410, packaged in a single grid stack. A failure in any resistor 401, 402, 403, 404, 405, 406 or motor 400 will measure as a differential current.

Figure 25:
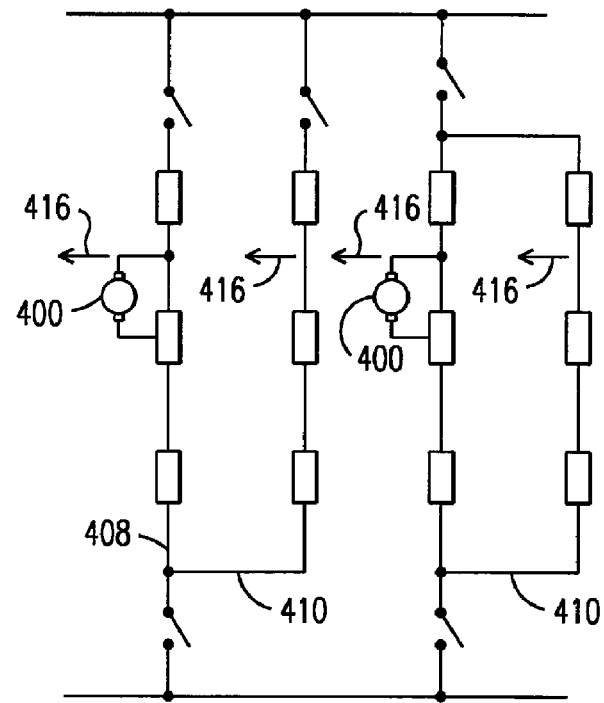
FIG. 25 depicts an exemplary embodiment of the present invention with voltage sensors applied to each leg.

FIG. 25 depicts an exemplary embodiment of the present invention with voltage sensors applied to each leg. Though the blowers 400 are illustrated as being connected to the first grid leg 408, those skilled in the art will readily recognize that this embodiment can also have the blower as configured in FIG. 21 or 22. Furthermore, though voltage sensors 416 are illustrated as being applied to both legs 408, 410, when in the configuration illustrated in FIG. 22 is used, only a single voltage sensor 416 may be used. In any embodiment, a failure in a resistor 401, 402, 403, 404, 405, 406 and/or motor 400 will show up as a voltage change that may be detected. In an exemplary embodiment the voltage differential may be taken with respect to ground and/or any other location in the circuit. Towards this end the voltage sensors 416 may be disclosed in a plurality of locations in the circuit. By doing so, in an exemplary embodiment, the voltage readings may be compared to a non-blower leg of the circuit to another non-blower leg of the circuit. In an exemplary embodiment a change in a voltage reading over time may indicate a problem.

Figure 26:
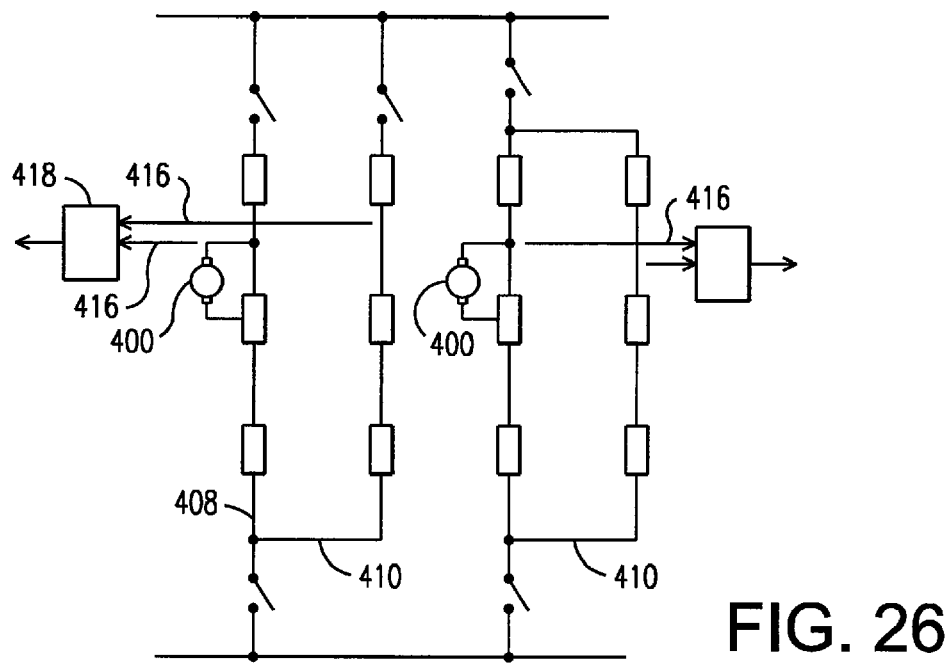
FIG. 26 depicts an exemplary embodiment of the present invention with sensors to measure differential voltages.

FIG. 26 depicts an exemplary embodiment of the present invention with sensors to measure differential voltages. Though the blowers 400 are illustrated as being connected to the first grid leg 408, those skilled in the art will readily recognize that this embodiment can also have the blower as configured in FIG. 21 or 22. As illustrated voltage sensors 416, a set of grid legs 408, 410 provide their outputs to a differential voltage sensor 418. A resistor and/or motor failure will show up as a differential voltage, which may be detected.

Figure 27:
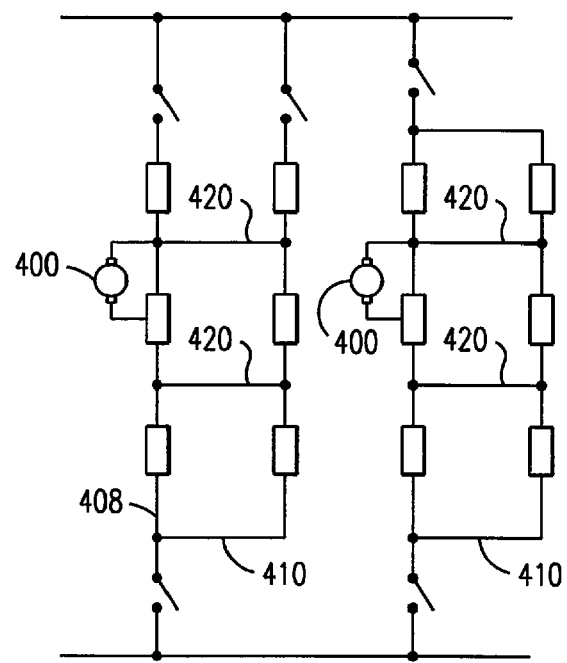
FIG. 27 depicts an exemplary embodiment of the present invention with a parallel connection of the grid elements.

FIG. 27 depicts an exemplary embodiment of the present invention with parallel connection of the grid elements. By parallel connecting 420 between each adjacent grid element 401, 402, 403, 404, 405, 406, any resistor 401, 402, 403, 404, 405, 406 failure may impact the applied motor voltage which affects motor speed. Current and/or voltage sensing, as discussed above, may be done as well for increased fidelity and blower 400 failure detection.

Figure 28:
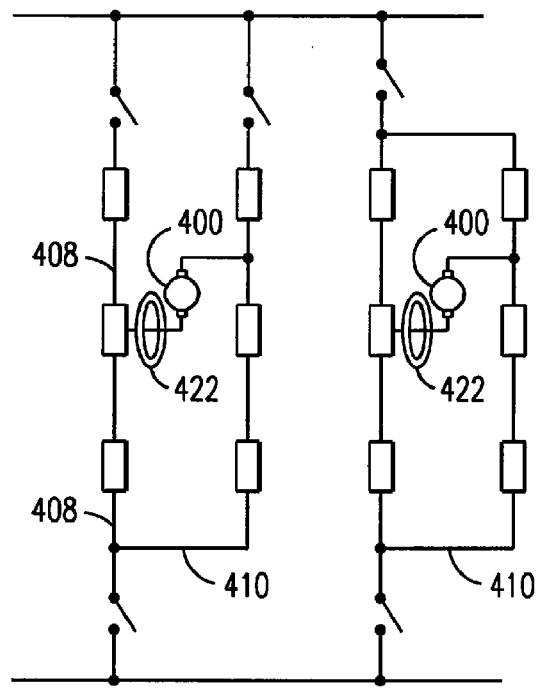
FIG. 28 depicts an exemplary embodiment of the present invention with blower current sensors where the motor is cross connected.

FIG. 28 depicts an exemplary embodiment of the present invention with blower current sensors where the motor is cross connected. One lead on the blower 400 is connected to a first grid leg 408, and the second lead is connected to the second grid leg 410. A current sensor 422 is applied across one lead on the blower 400. A failure in any resistor 401, 402, 403, 404, 405, 406 affects the applied voltage. Thus, a failure can be detected by the corresponding change in blower speed. Increased detection of resistor failure and blower capability is realized with the blower current sensor.

Figure 29:
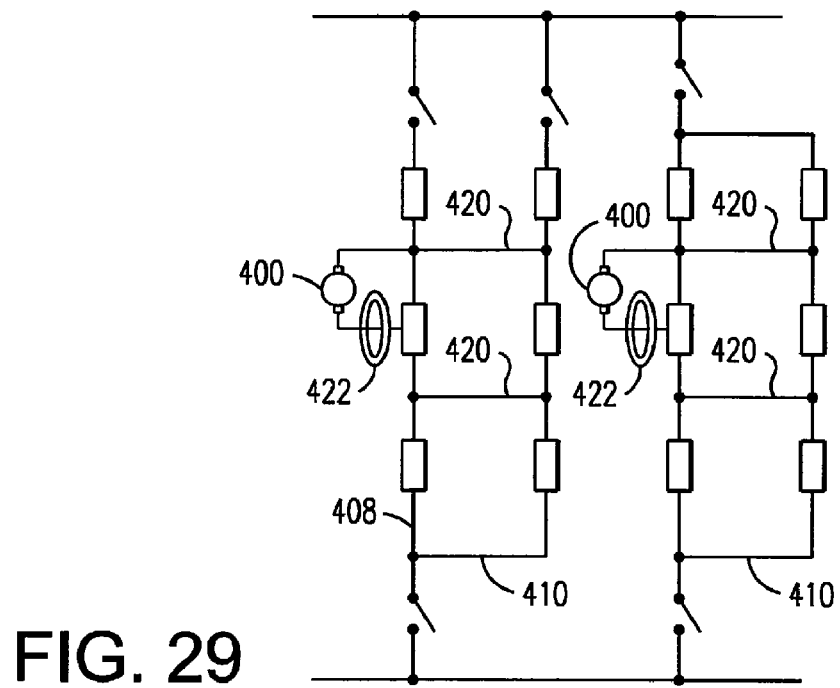
FIG. 29 depicts an exemplary embodiment of the present invention with a blower current sensor and parallel connected grid elements.

FIG. 29 depicts an exemplary embodiment of the present invention with a blower current sensor and parallel connected grid elements. As disclosed above in FIG. 27, mirror resistors are connected in parallel 420. By doing so, any resistor failure impacts the applied motor voltage which affects the motor's 400 speed. By providing a sensor 422 to measure blower 400 current, increased grid resistor 401, 402, 403, 404, 405, 406 fidelity and faster detection response is realized. A blower current 422 also enables detection of blower 400 failures.

Figure 30:
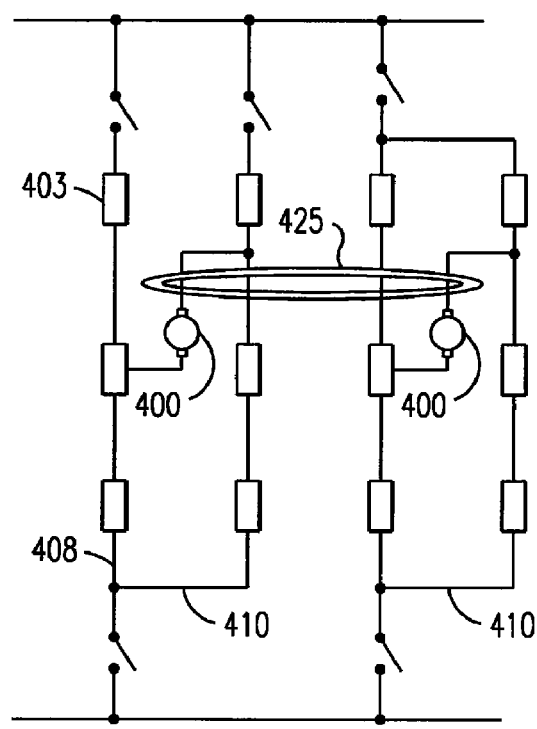
FIG. 30 depicts an exemplary embodiment of the present invention with a differential blower current sensor used with cross connected motors.

FIG. 30 depicts an exemplary embodiment of the present invention with a differential blower current sensor used with cross connected motors. As illustrated, one lead from the blower 400 is connected to a first leg 408 of the grid and the second lead is connected to the second leg 410 of the grid. A current differential sensor 425 is applied so as to access differential in currents across the blowers 400 in the grid. A failure in any resistor 401, 402, 403, 404, 405, 406 will affect the applied motor voltage. Thus, a failure is detected by a change in blower speed. Additionally, increased grid and blower 400 failure detection capability is realized because of differential detection of the motor currents.

Figure 31:
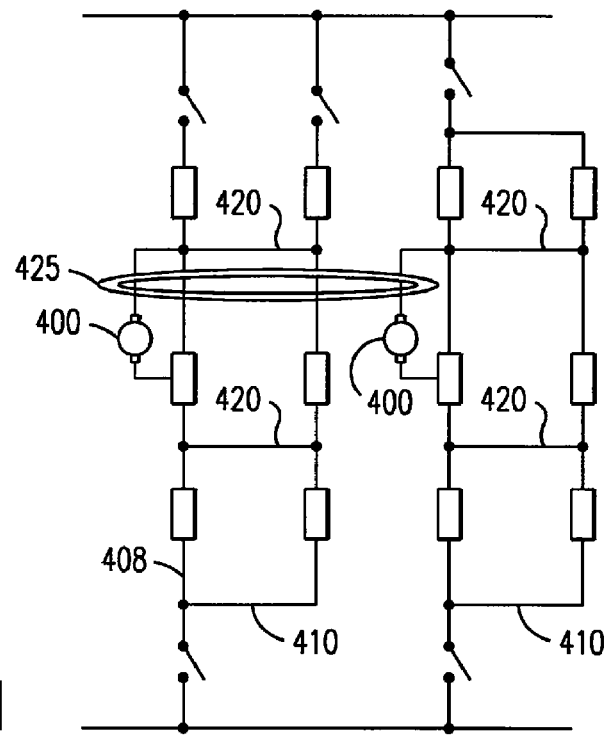
FIG. 31 depicts an exemplary embodiment of the present invention with a differential blower current sensor used with parallel connected grid elements.

FIG. 31 depicts an exemplary embodiment of the present invention with a differential blower current sensor used with parallel connected grid elements. As discussed above, applying parallel connections between corresponding grid elements, any resistor failure will impact the applied motor voltage which, in turn, affects the speed of the motor 400. Blower current measurement adds potential increased resistor failure. Increased grid and blower 400 failure detection capability is realized because of differential detection of the motor currents.

Figure 32:
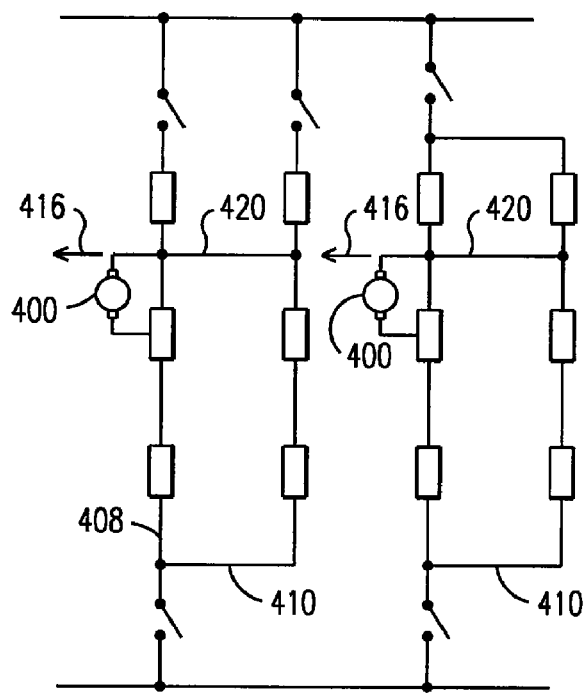
FIG. 32 depicts an exemplary embodiment of the present invention with parallel connection of grid elements and a voltage sensor.

FIG. 32 depicts an exemplary embodiment of the present invention with parallel connection of grid elements and a voltage sensor. FIG. 32 is a continued illustration of FIG. 27 with voltage sensors 416. In this embodiment, both grid resistor 401, 402, 403, 404, 405, 406 and blower 400 failure capability is achieved.

Figure 33:
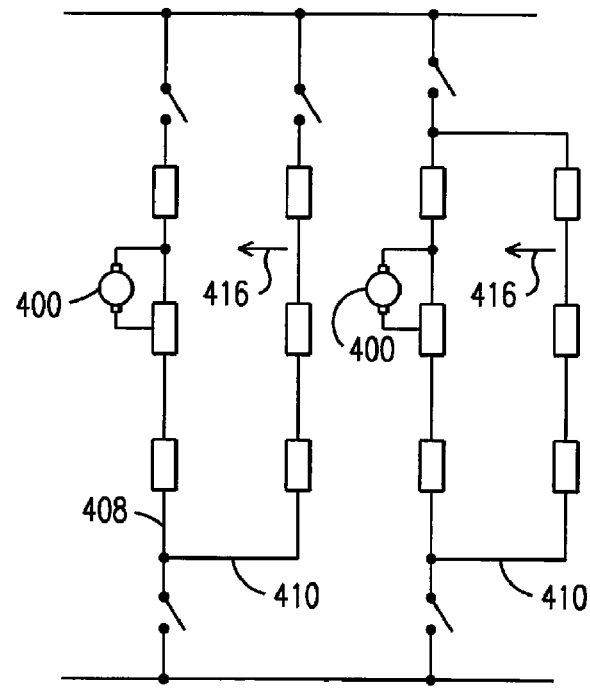
FIG. 33 depicts an exemplary embodiment of the present invention with voltage sensors in non-blower legs of the grid.

FIG. 33 depicts an exemplary embodiment of the present invention with voltage sensors in non-blower legs of the grid. As illustrated, the blower is in the first leg 408. As discussed herein, the leg most likely to realize a failure is the second leg 410. Towards this end, by including a voltage sensor 416 in the non-blower leg 410 of the grid, detection of a failure in this leg is realized sooner. Those skilled in the art will readily recognize that other sensing combinations are applicable, such as but not limited to differential sensor between blower grid legs, differential sensors between non-blower grid legs, etc.

Figure 34:
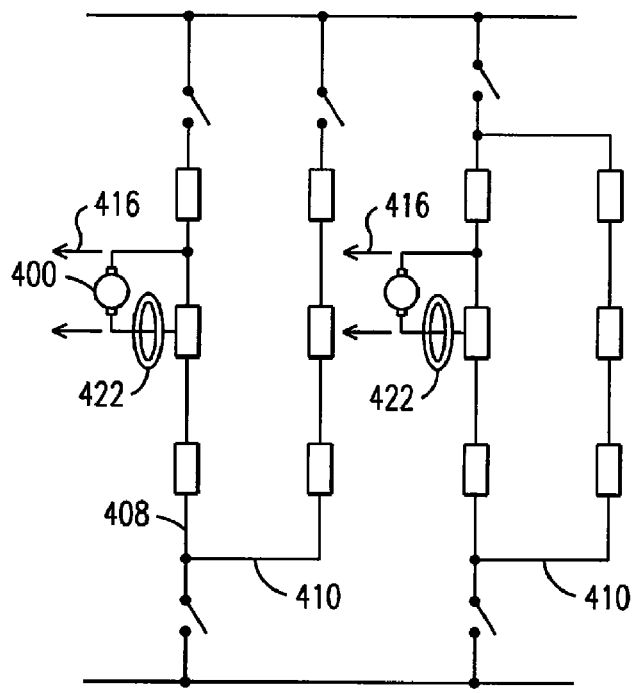
FIG. 34 depicts an exemplary embodiment of the present invention with voltage sensors and current sensors.

FIG. 34 depicts an exemplary embodiment of the present invention with voltage sensors and current sensors. Blower 400 detection can be made by current measurements compared to a model or by comparison of blower in the system to that of another blower. Currents may be corrected due to ambient pressure and temperature give provide for added resolution. Current measurements may be normalized with respect to a sensed voltage or current to provide for additional control flexibility. Similarly, blower 400 detection can be accomplished by taking voltage readings with a voltage sensor 416 and compared to a model or comparison to another blower's current. Voltages may be corrected due to ambient pressure and temperature to provide added resolution. Voltage measurements may be normalized with respect to a sensed voltage and/or current to provide for added control flexibility.

As illustrated, combined application of blower current sensors 422 and voltage sensors 416 may be combined. Towards this end, blower current data and/or voltage data may be compared to the blower's speed or to data from a neighboring motor 400 to determine whether a fault has occurred. Blower motor 400 shorts, open circuits, and intermediate faulty operation would be detectable. As discussed above, blower failures may be established by other sensed currents and voltages elsewhere in the circuit, with similar control potential.

Figure 35:
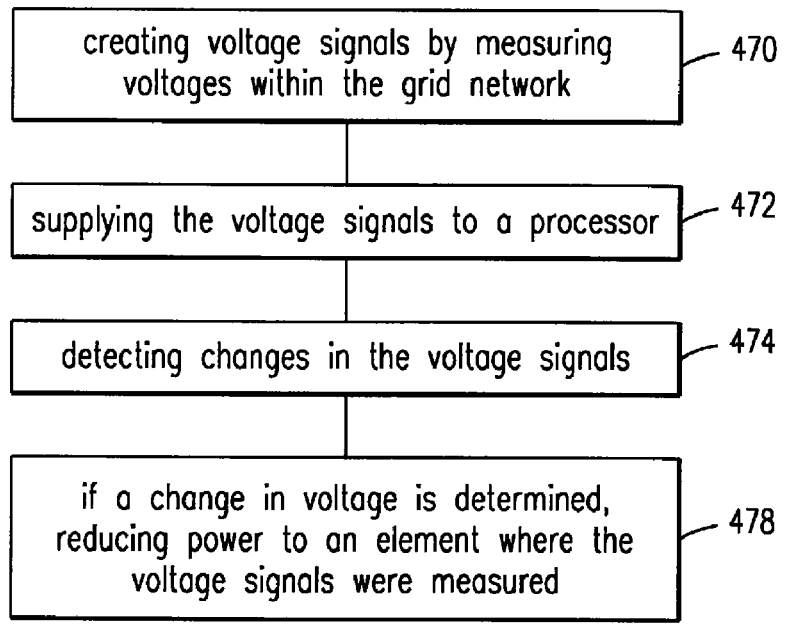
FIG. 35 depicts an exemplary flow chart of the present invention.

FIG. 35 depicts an exemplary flow chart of the present invention. As illustrated, a voltage signal is created by measuring a voltage within the grid network. The voltage signal is supplied to a processor. Changes in the voltage signal are detected. If the change in voltage is determined, power to an element, such as determined by a node location where the voltage is read, is reduced. Though disclosure is directed at voltage, those skilled in the art will readily recognize that voltage can be exchanged with current, wherein the same steps may be accomplished with respect to current.

In an exemplary embodiment, such as illustrated in FIG. 26 and FIG. 25, voltage sensors are placed throughout the grid package for measuring various voltages. In more detail as disclosed in FIG. 35, these measured signals, step 470, are conditioned via resistor-divider and analog to digital circuits into a microprocessor, step 472. The logic within the processor detects changes in the voltage readings to a specified degree of change, step 474. When this predefined degree of change is realized, power is reduced and the failed component is isolated from the circuit, step 478. Any grids that remain operational may still be used for dynamic braking.

Figure 36:
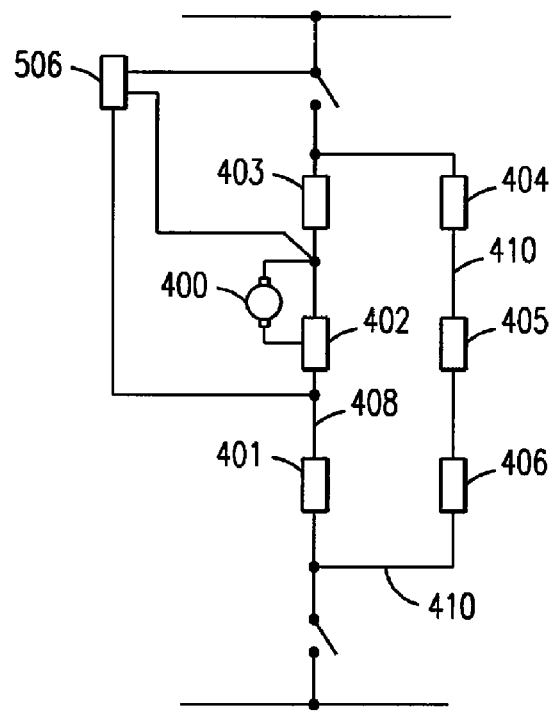
FIG. 36 depicts an exemplary illustration of elements of the present invention.

FIG. 36 depicts exemplary illustration of elements of the present invention. As illustrated, a processor 506 is provided. The processor 506 is able to communicate with nodes in a grid network so as to determine a change in a measurable value, such as, but not limited to, current value and/or voltage value. When a blower 400 is also part of the braking system, the processor 506 is also able to determine blower motor speed. The processor 506 is able to detect changes in the measurable value and when a change outside of an acceptable range is determined, the processor is able to reduce power. In an exemplary embodiment, the processor is able to determine where the measurable value is measured, specific to which nod or component or element, such as a specific resistor, and/or blower. With this information, the processor can reduce power for that node and/or element only.

The exemplary embodiment discussed above may be accomplished using an implemented method through a software algorithm. Two different types of sensing inputs may be used. One is a point in the resistor circuit with respect to common ground of the circuit, or system, called the single-ended. Another is a point in the resistor circuit with respect to a separate point in the resistor circuit called a differential. Each type of input is taken through a voltage-divider circuit into an operational amplifier. The output is then taken through an analog to digital conversion.

When tolerance to ground shifts in the system are realized, two single-ended signals can be compared to each other in the microprocessor, called pseudo-differential. Additionally, a single-ended signal can be adjusted by the amount of ground content in the system. This adjustment allows for the distinction of failures from ground in the system.

For improved detection capability, all manufactured sources of variation are adapted out of the detection limits. This may be accomplished by slowly lowering the detection limit trending towards the nominal values for the differential and pseudo-differential inputs.

One exemplary approach to failure detection that is advantageous for single-ended signals that may not be sampled at the same time involves a difference in range. The range for a single-ended signal is a difference between a maximum and minimum that has occurred in some prior time period for that given signal. Any differences in the ranges of two single-ended signal can only be a true failure event as opposed to information from the sampling difference.

Another exemplary approach of failure detection is the use of adaptive limits described herein. Once the long-term variations are adapted to, any changes in the differential information beyond the limits can be resistance changes due to failure. To prevent one sample of misinformation from causing nuisance detection, a low pass filter is used to accomplish this.

In an exemplary embodiment, a determination as to whether a significant ground is present should be made. Too much ground content can saturate the voltage inputs. Another determination is with respect to an indication of how much time has passed since a change was made to the power circuit, or system. Transients can be induced on the inputs during power circuit reconfigurations.

Once at least one of the detection methods discussed above are satisfied, restrictive actions may be taken to isolate elements that may be causing the fault. As discussed herein, the failed component will be removed from the system. However, the time to perform this can be considered relatively slow from a control standpoint. Thus, in an exemplary embodiment, the power sources, inverters, are torque reduced to quickly reduce power.

Within the system, multiple contactors may bring the resistors in and out of the circuit. Given the connection of the voltage feedbacks, for each configuration of the contactor states, the set of voltage feedbacks is known. By knowing the feedbacks from each state, a final decision can be determined. If all feedbacks appear to be correct, then the hardware is present and in use. If no feedbacks look correct, then the hardware is not in use. Finally, if some of the feedbacks look correct, then the hardware is present with some of the inputs incorrectly connected. Detecting a failure is not limited to monitoring changes in such values as blower speed, a circuit's current, and/or a circuit's voltage. During a failure of a dynamic braking resistor on board a locomotive, or other piece of electrical equipment, noise, light and heat are physical characteristics upon which a failure detection system could also be based. The noise and light are associated with arcs that occur during failure and the heat is a product of the arcing in conjunction with overheating of the device's conductors and insulation system.

During electrical failure of the dynamic braking resistor, and other devices, failure often is associated with the electrical discharge and arcing among components of different voltage potentials. This arcing has a distinct noise associated with it. This arcing could be detected by measuring the noise in the proximity of the equipment with a microphone or similar device. By performing a frequency analysis of the noise, it is possible to filter out the background noises associated with surrounding equipment, such as with respects to a locomotive, engine noise, blower noise, etc, to detect the noise of the arc. When sound matching the frequency content of the arc is sensed, control action could take place to remove power.

Figure 37:
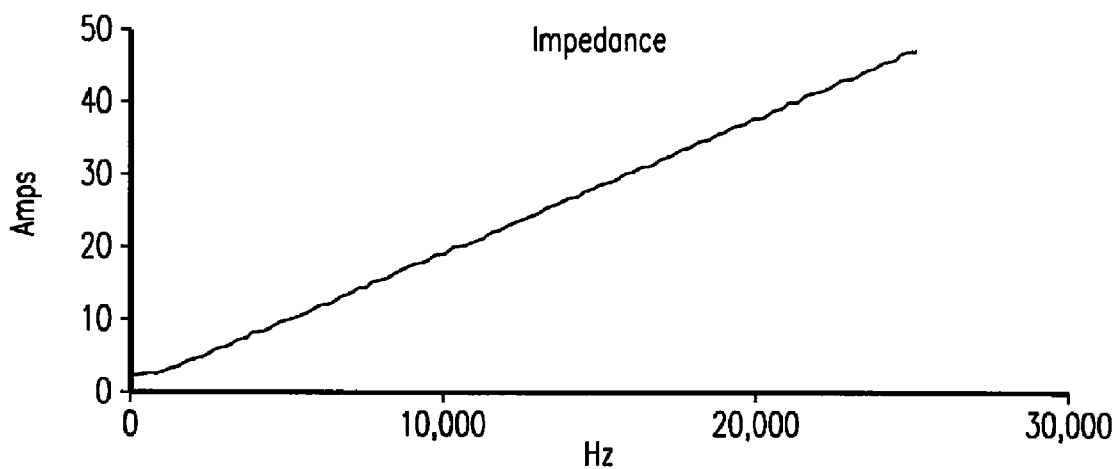
FIG. 37 depicts an exemplary illustration of a graph illustrating impedance over frequency.
Figure 38:
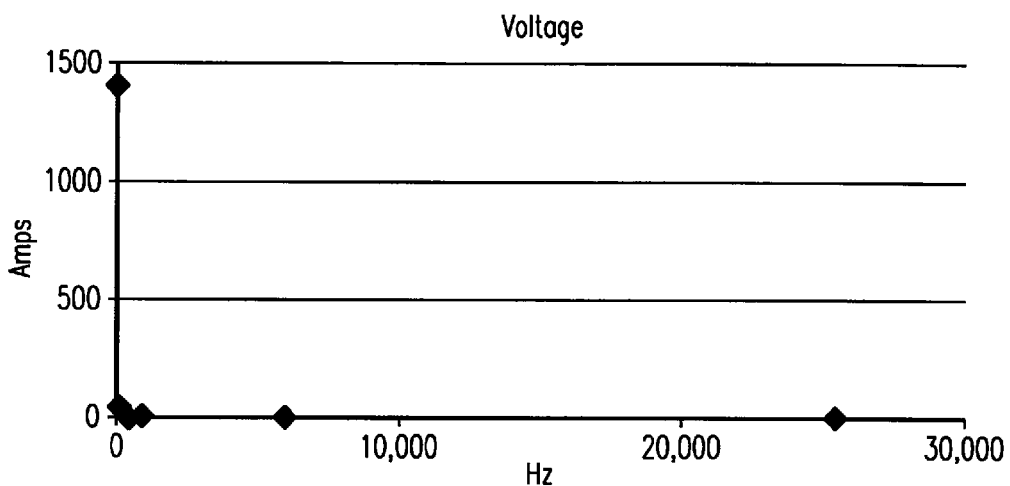
FIG. 38 depicts an exemplary illustration of a graph illustrating AC and DC voltage over frequency.
Figure 39:
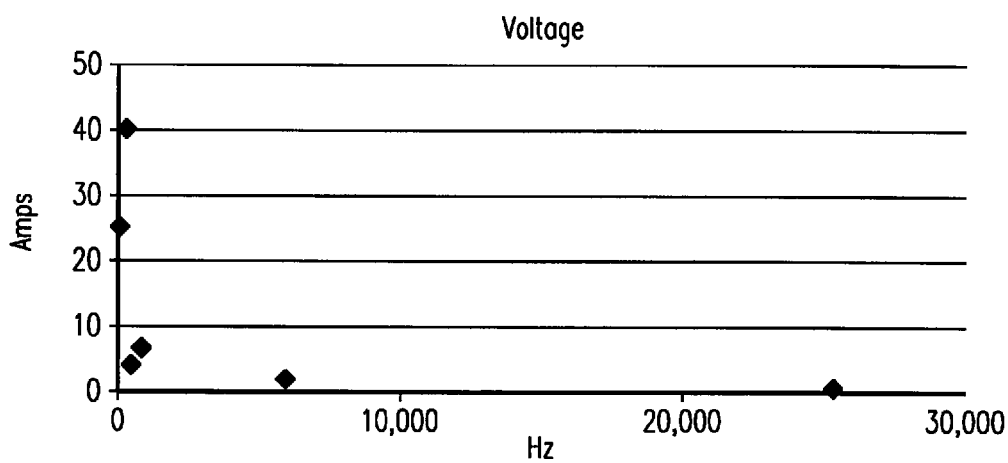
FIG. 39 depicts an exemplary illustration of a graph illustrating AC voltage only over frequency.
Figure 40:
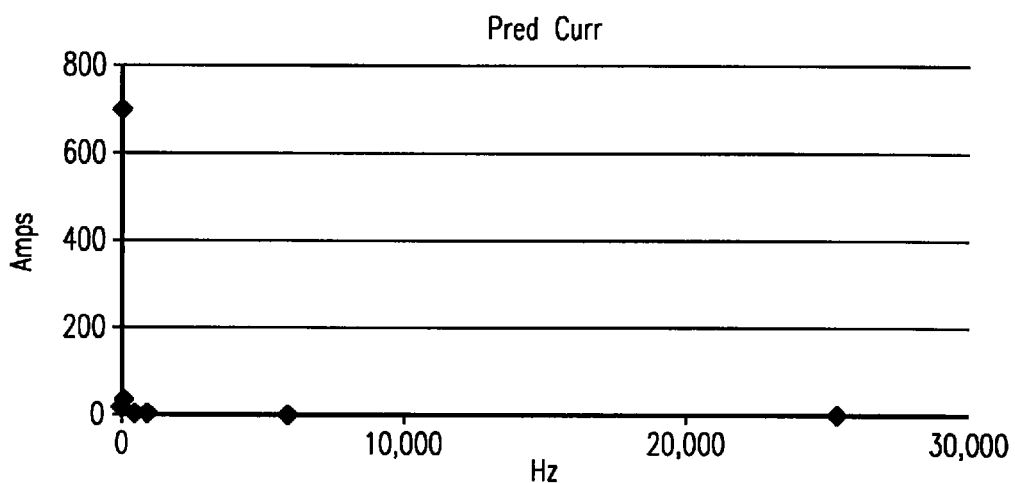
FIG. 40 depicts an exemplary illustration of a graph illustrating a predicted AC and DC current over frequency.
Figure 41:
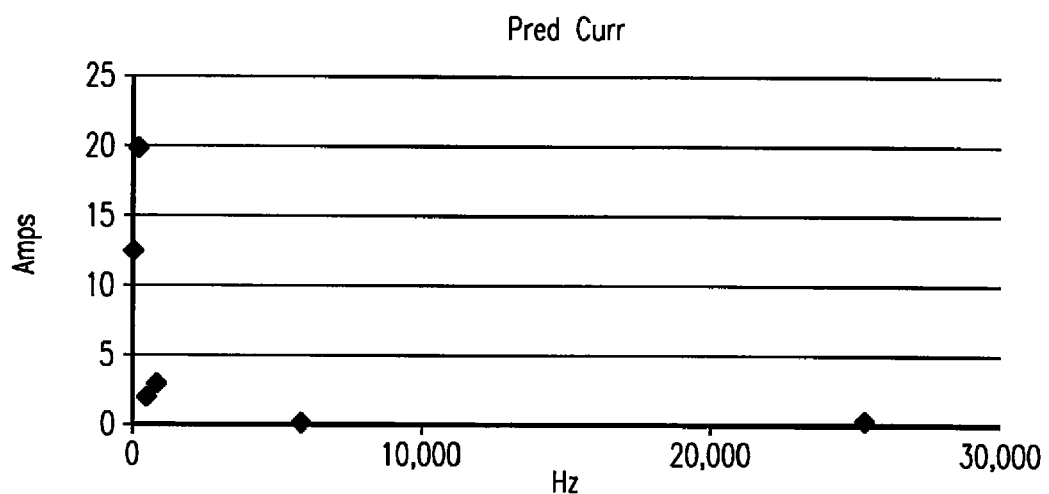
FIG. 41 depicts an exemplary illustration of a graph illustrating a predicted AC current over frequency.
Figure 42:
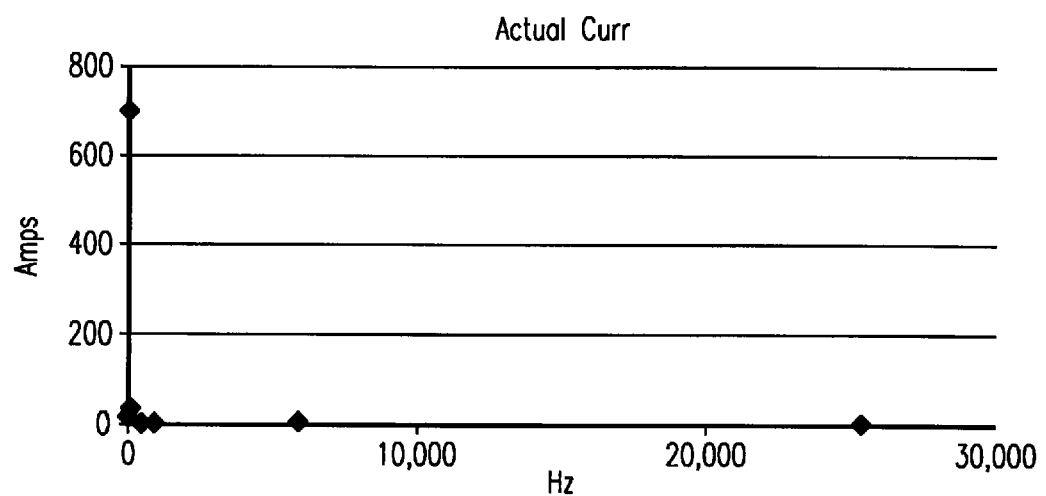
FIG. 42 depicts an exemplary illustration of a graph illustrating an actual AC and DC current over frequency.
Figure 43:
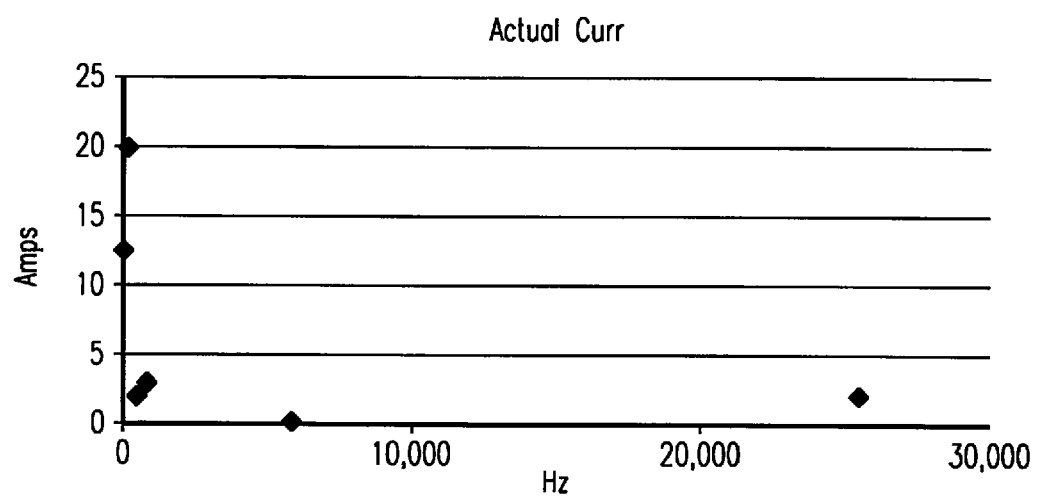
FIG. 43 depicts an exemplary illustration of a graph illustrating an actual AC current over frequency.

In another exemplary embodiment, a failure may be detected by comparing a measured value to a predicted value. For example, as illustrated in FIG. 37, impedance in a braking system increases proportionally to higher frequency. FIG. 38 depicts voltage, both AC and DC, over frequency whereas FIG. 39 is AC voltage alone. FIG. 40 depicts an exemplary embodiment of predicted current values over frequency for all current, whereas FIG. 41 illustrates AC current only based on voltage applied to the grid and impedance, as illustrated in FIG. 37. FIGS. 42 and 43 depict exemplary embodiments of actual current readings wherein FIG. 42 illustrates both AC and DC current, and FIG. 43 depicts AC currently only based on voltage applied to the grid and impedance, as illustrated in FIG. 37.

Figure 44:
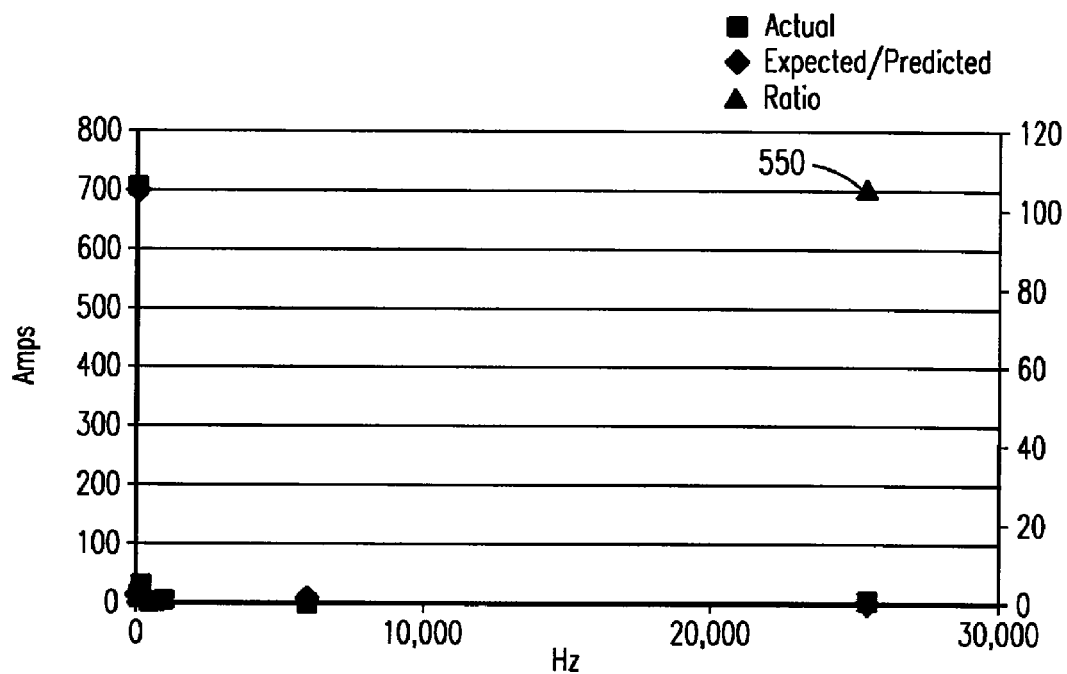
FIG. 44 depicts an exemplary illustration of a graph illustrating actual current, predicted current and a ratio of actual current to predicted current over frequency.
Figure 45:
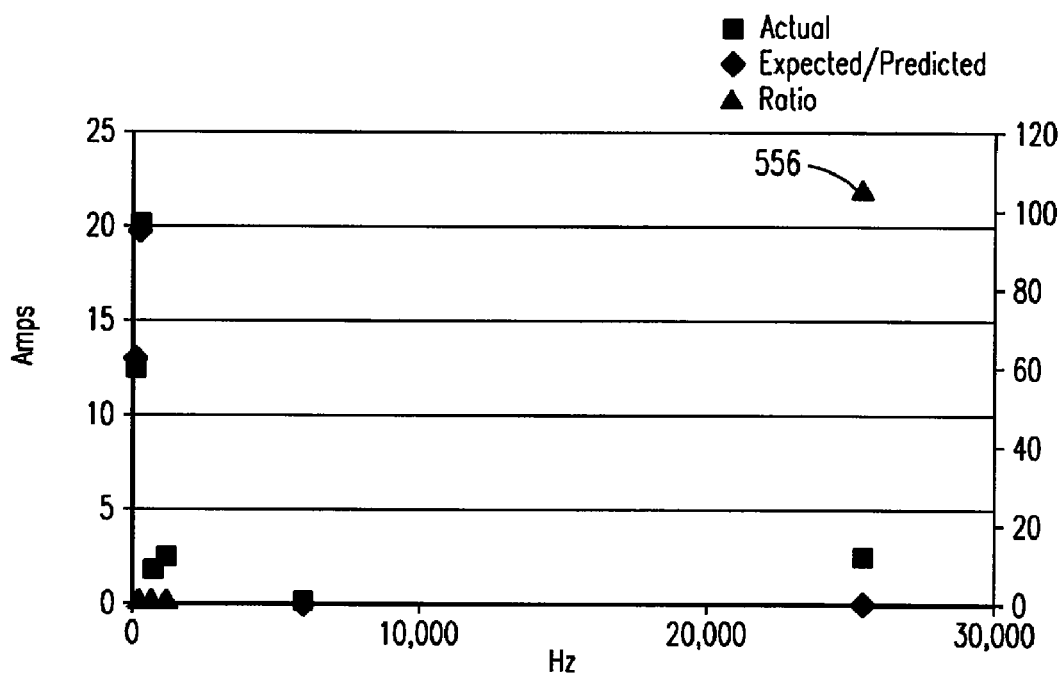
FIG. 45 depicts an exemplary illustration of a graph illustrating actual AC current, predicted AC current and a ratio of actual current to predicted current over frequency.

FIGS. 44 and 45 depict exemplary embodiments of measured current, predicted current and a ratio of actual to predicted current. The squares on these graphs represent actual current values and the vertical scale on the left side of the graph is used. The diamonds represent expected, or calculated current values and the vertical scale on the left side of the graph is used. The triangles represent ratio of actual current to predicted current, wherein the vertical scale on the right side of the graph is used. FIG. 44 illustrates AC and DC current, and FIG. 45 illustrates AC current only, as discussed above. As illustrated in FIGS. 44 and 45, the actual current and expected current values are nearly the same, expect for at approximately 25000 hertz. As illustrated, the ratio 550, 556 of the actual current value to the expected current at this frequency is approximately 100 times greater. Thus, this value 550, 556 may identify an anomaly, such as arcing. As discussed herein, when such a ratio is disclosed power may then be removed or reduced from the grid. Towards this end, a determination may be made to remove and/or reduce power if the ratio is at a certain rate.

Though the illustrations depict exemplary illustrations of predicted current, actual current and a ratio of actual to predicted current, those skilled in the art will readily recognize that a similar graph may be developed based on predicted voltage, actual voltage, and the ratio of actual to predicted voltage. Furthermore, this exemplary illustration need not be based on a predicted current and/or voltage. Specifically, a determination as to whether an anomaly is occurring may be based on whether an actual measurable value is outside of a given threshold. Those skilled in the art will readily recognize that the threshold may be based on a plurality of factors. For example, though not limited to these examples, exemplary illustrations of the threshold may include a ratio, pre-defined value, and/or delta.

In another exemplary embodiment a failure may be detected by monitoring the frequency content of the voltage or currents measured proximate to the grid circuit. When a grid or blower fails in such a way as to cause an arc, a distinct frequency can be detected in the current and/or voltages to indicate this failure.

Likewise, during electrical failures, the intense light emitted during the discharge of an arc could be sensed and used to signal the control system to remove power. In this case, the approach would be to measure the light emission of the components via photo-optical and related equipment whereby the intensity and/or frequency content of the light emitted by an arc could be detected.

Finally, during the failure event, the temperature of the arc is extremely high in comparison to the temperature of the background devices and surroundings. This temperature could be detected through infra-red or similar measurement techniques. Once temperatures above a specific threshold are detected, failure isolation could be triggered. In addition to this approach, temperatures could also be measured by standard analog techniques (RTD, thermocouple, etc.) with associated limits and controls to remove power in the event of a failure and excessive measured temperature.

Figure 46:
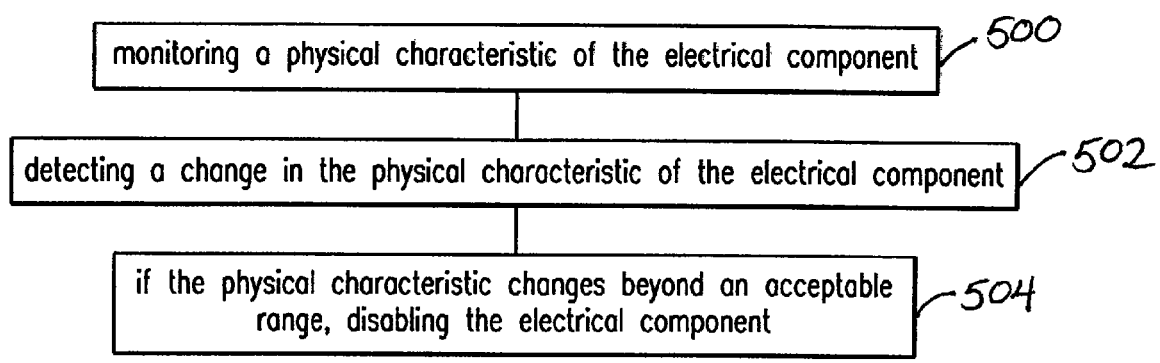
FIG. 46 depicts an exemplary flow chart for detecting a failure based on a change in physical characteristics.

Towards this end, FIG. 46 depicts an exemplary flow chart for detecting a failure based on a change in physical characteristics. As illustrated, a physical characteristic of an electrical component is monitored, step 500. A change in the physical characteristic of the electrical component is detected, step 502. If the physical characteristic changes beyond an acceptable range, the electrical component is disabled, step 504.

A computer software code may be used to implement the present invention. Towards this end, persons skilled in the art will recognize that an apparatus, such as a computer, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, or computer, could include a storage medium and program means recorded thereon for directing the data processing system to facilitate the practice of the method of the invention. Such apparatus and articles of manufacture also fall within the spirit and scope of the invention.

Broadly speaking, the technical effect provides a method, apparatus, and computer software code, or program, for isolating electrical ground and secondary failures in electrical systems. To facilitate an understanding of the present invention, it is described above with reference to specific implementations thereof. The invention is described in the general context of computer-executable instructions, such as program modules, being executed by a computer. Generally, program modules include routines, programs, objects, components, data structures, etc. that performs particular tasks or implement particular abstract data types. For example, the software programs that underlie the invention can be coded in different languages, for use with different platforms. In the description that follows, examples of the invention are described in the context of a web portal that employs a web browser. It will be appreciated, however, that the principles that underlie the invention can be implemented with other types of computer software technologies as well.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. In an off-road vehicle having a resistor grid network and a blower system as part of a braking system operable to determine at least one of a resistor failure and a blower failure, the system comprising:
   a resistor forming a grid network;
   a blower connected to the resistor;
   a sensor proximate the blower to measure a value associated with the blower;
   wherein when the measured value is outside of a specific range, the grid network is disconnected; and
   wherein the measured value comprises blower speed.

2. The system of claim 1 further comprises a second resistor wherein the first resistor and the second resistor are connected in at least one of series and parallel.

3. The system of claim 1 wherein the measured value of the blower comprises at least one of blower speed, blower current, and blower voltage.

4. The system of claim 2 wherein the blower is cross connected between the first resistor and the second resistor.

5. In an off-road vehicle having a resistor grid network and a blower system as part of a braking system operable to determine at least one of a resistor failure and a blower failure, the system comprising:
   (a) a first series of resistors connected in series;
   (b) a second series of resistors connected in series;
   (c) a blower cross connected between the first series of resistors and the second series of resistors;
   (d) a sensor connected in series with the blower to monitor a measurable value; and
   (e) wherein when the measurable value monitored by the sensor is outside of a specified range, the grid network is disconnected.

6. The system of claim 5 wherein the sensor is at least one of a current sensor and a voltage sensor.

7. In an off-road vehicle having a resistor grid network and a blower connected to the resistor grid network as part of a braking system a method for determining at least one of a resistor failure and a blower failure, the method comprising:
   sensing a blower speed associated with the blower; and
   at least one of minimizing power and discontinuing power supplied to the grid network when the blower speed is outside of a specific range.

8. The method of claim 7 wherein the resistor grid network comprises one resistor.

* * * * *